United States Patent [19]
Terada et al.

[11] Patent Number: 6,124,888
[45] Date of Patent: Sep. 26, 2000

[54] IMAGE PICKUP APPARATUS CAPABLE OF READING IN OPTIONAL READING MODE

[75] Inventors: Toshiyuki Terada, Machida; Hidetoshi Fukuda, Yokohama; Shinichi Nakajima; Jun Inoue, both of Hachioji, all of Japan

[73] Assignee: Olympus Optical Co., Ltd., Tokyo, Japan

[21] Appl. No.: 08/812,585

[22] Filed: Mar. 7, 1997

[30] Foreign Application Priority Data

Mar. 11, 1996 [JP] Japan ................................. 8-052904

[51] Int. Cl.[7] .................................................. H04N 5/335
[52] U.S. Cl. ........................................ 348/302; 348/308
[58] Field of Search ................................. 348/207, 294, 348/302, 307, 308, 309, 231, 303, 304; H04N 5/335

[56] References Cited

U.S. PATENT DOCUMENTS

| | | | |
|---|---|---|---|
| 4,597,012 | 6/1986 | Itoh et al. | 348/308 |
| 5,262,871 | 11/1993 | Wilder et al. | 348/307 |
| 5,452,004 | 9/1995 | Roberts | 348/308 |

FOREIGN PATENT DOCUMENTS

| | | |
|---|---|---|
| 57-13186 | 3/1982 | Japan . |
| 5-227486 | 9/1993 | Japan . |
| 5-300433 | 11/1993 | Japan . |

OTHER PUBLICATIONS

*English language Abstract thereof.

*Primary Examiner*—Tuan Ho
*Attorney, Agent, or Firm*—Frishauf, Holtz, Goodman, Langer & Chick, P.C.

[57] ABSTRACT

An image pickup apparatus for picking up an object comprises an image pickup device formed by arranging the photoelectric conversion elements constituting pixels in two-dimensional directions. A reading out circuit reads out from the image pickup device an electric signal obtained by photoelectric conversion with the image pickup device. A selecting portion selects from a plurality of reading out modes a reading out mode of the reading out circuit to carry out reading of the electric signal from the image pickup device. A memory circuit stores reading out positions of the image pickup device respectively in correspondence with the plurality of reading out modes. The reading out circuit reads out the electric signals from the image pickup device based on a reading out position corresponding to the reading out mode selected from the plurality of reading out modes by the selecting portion.

20 Claims, 27 Drawing Sheets

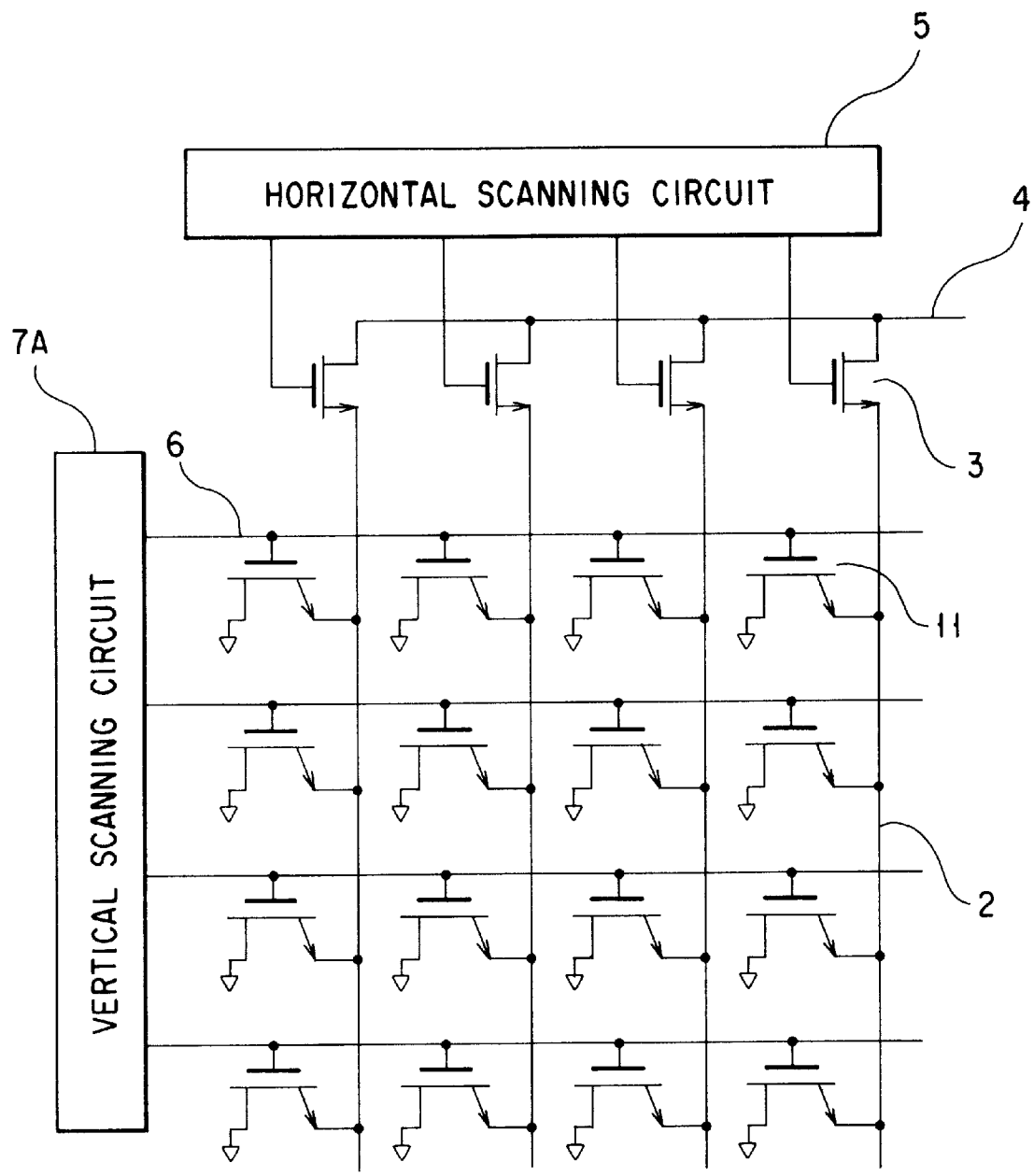
F I G. 4

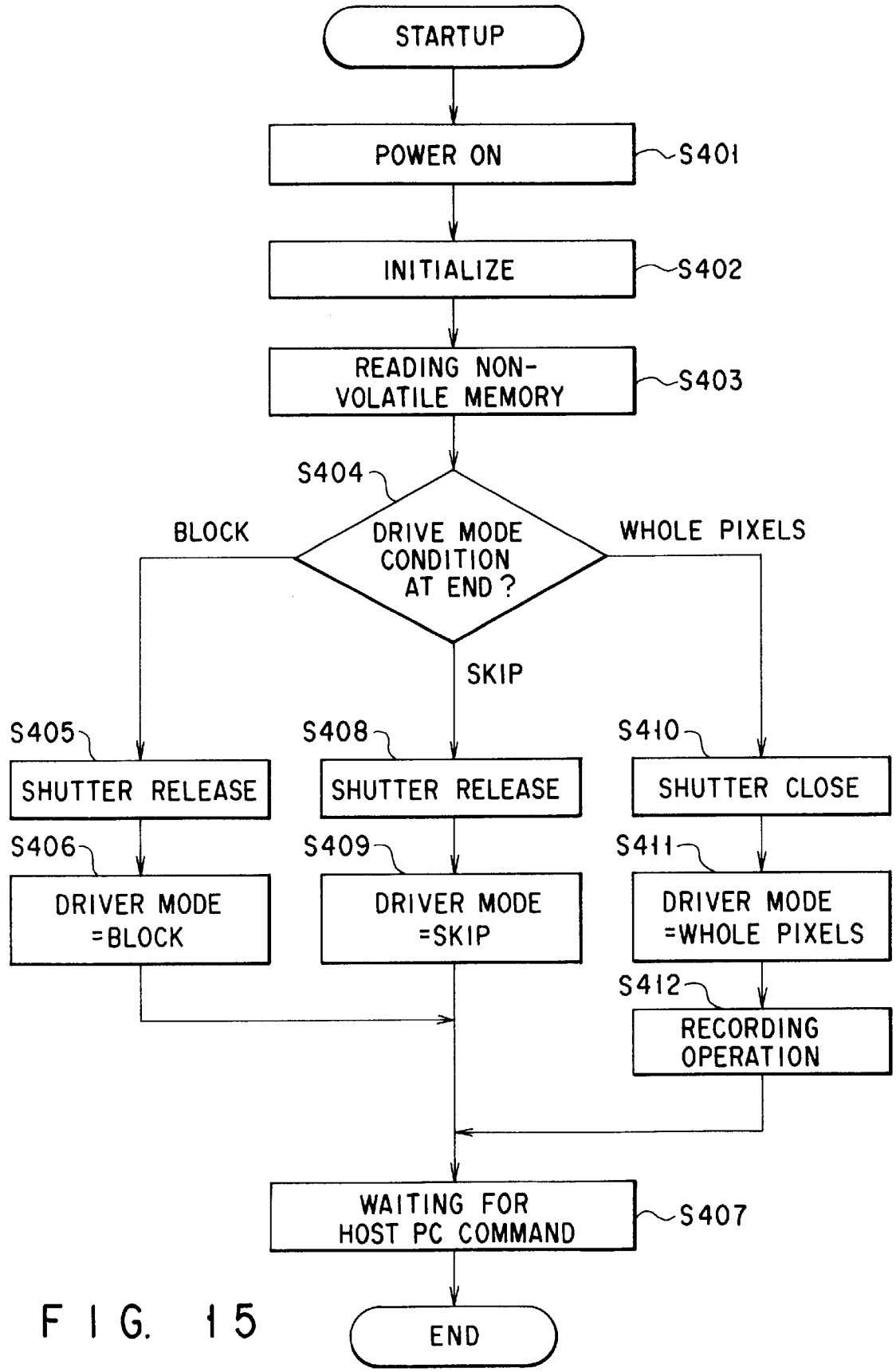
F I G. 15

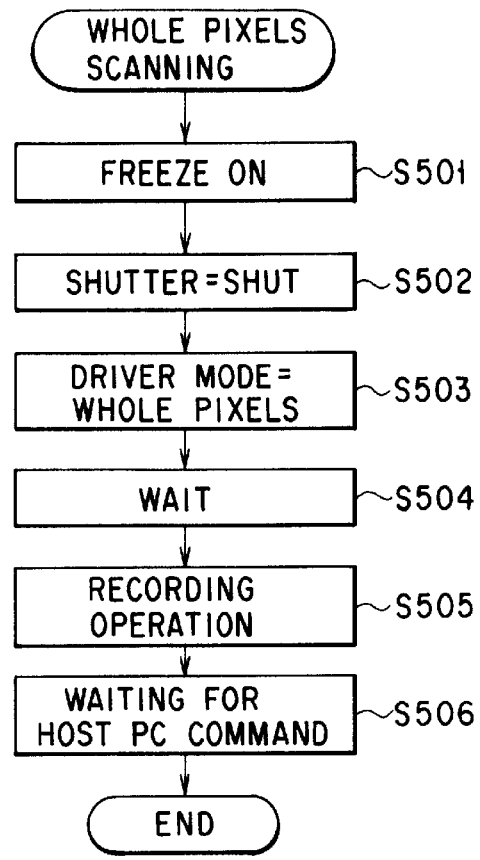
F I G. 16
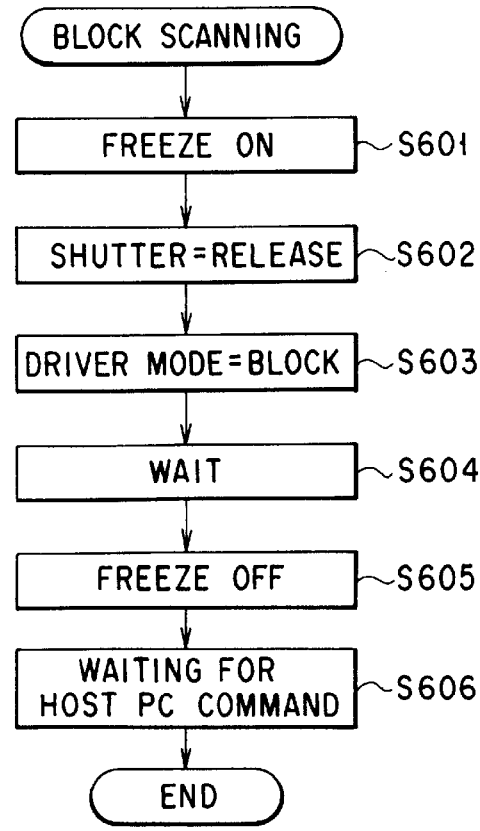
F I G. 17

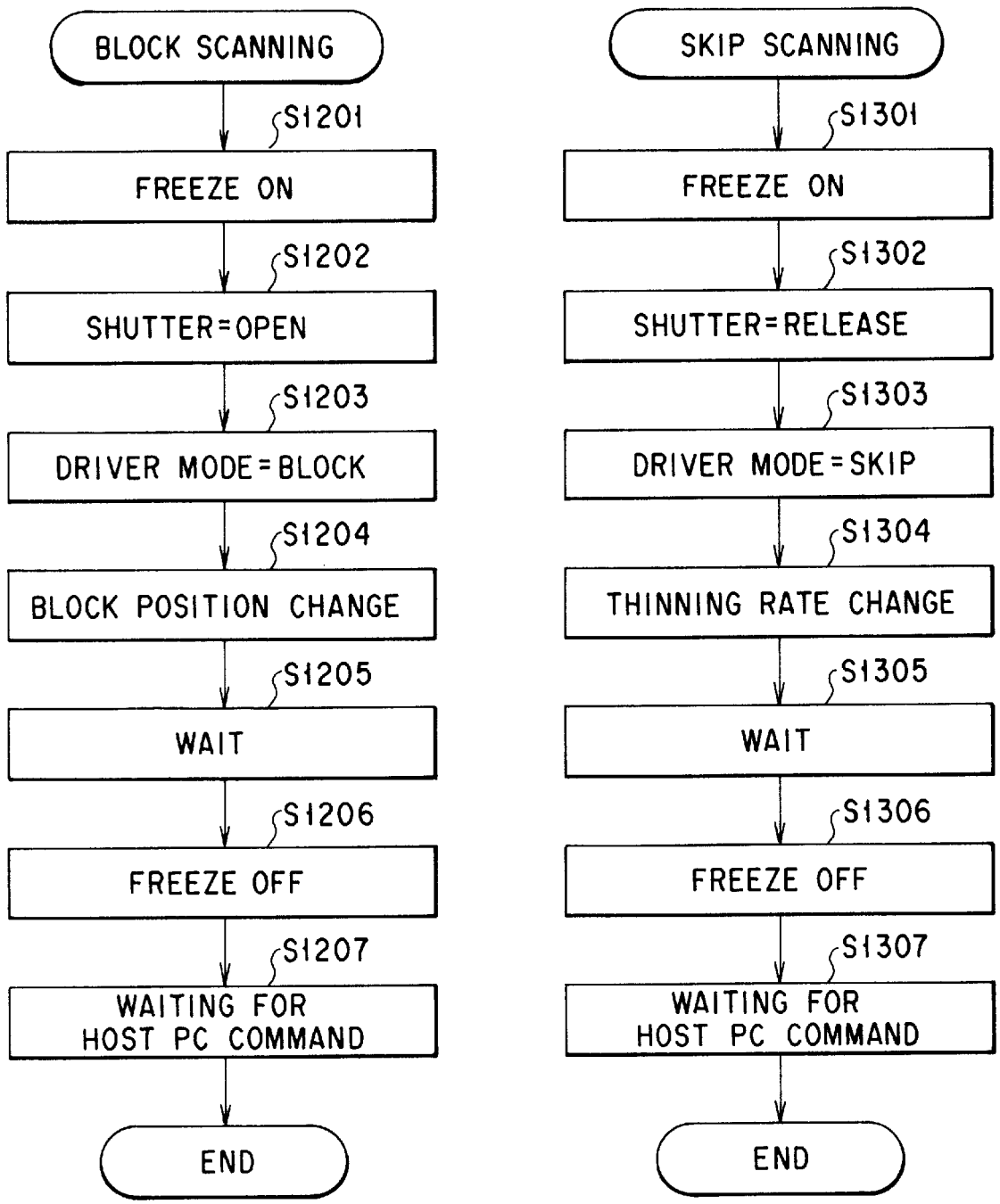
F I G. 23   F I G. 24

| Y\X | 1 | 2 | 3 | 4 |
|---|---|---|---|---|
| 1 | Ye | Cy | Ye | Cy |
| 2 | Mg | G | Mg | G |
| 3 | Ye | Cy | Ye | Cy |
| 4 | G | Mg | G | Mg |

| Y \ X | 1 | 2 | 3 | 4 |
|---|---|---|---|---|
| 1 | Ye (G+R) | Cy (G+B) | Ye (G+R) | Cy (G+B) |
| 2 | Mg (R+B) | G | Mg (R+B) | G |
| 3 | Ye (G+R) | Cy (G+B) | Ye (G+R) | Cy (G+B) |
| 4 | G | Mg (R+B) | G | Mg (R+B) |

FIG. 29A

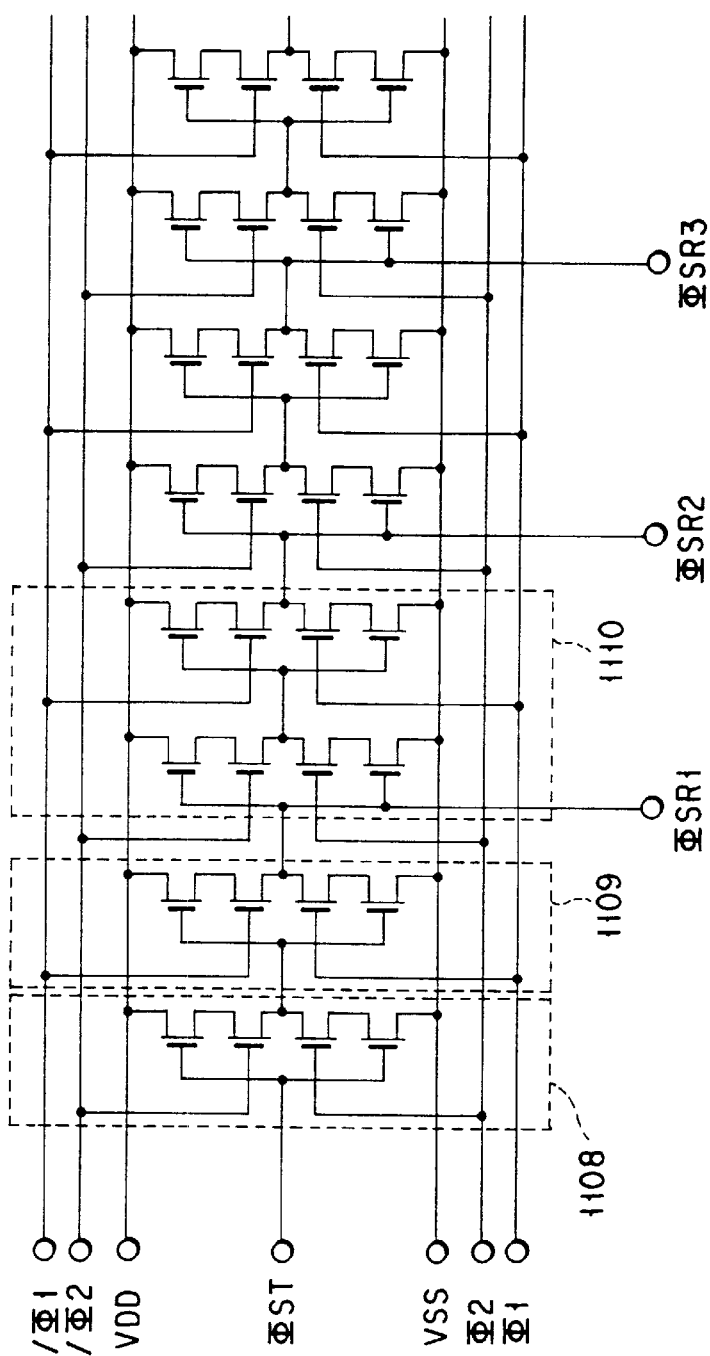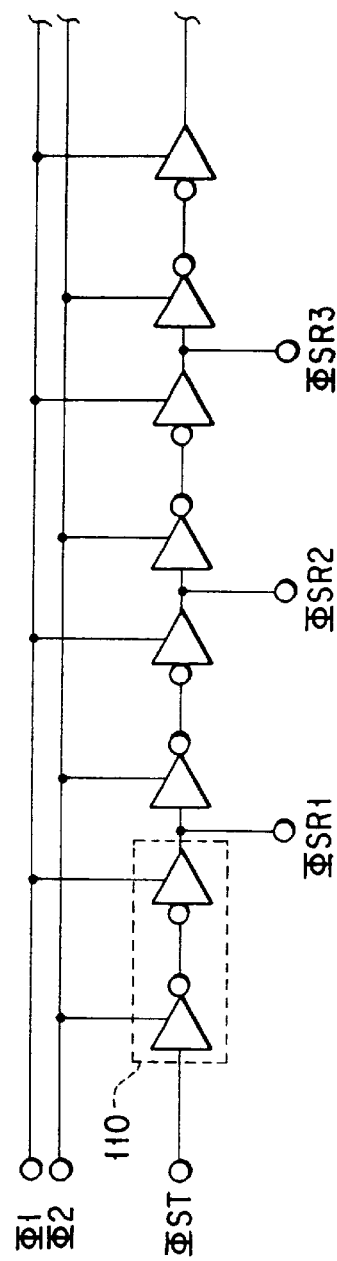
F I G. 31 (PRIOR ART)
F I G. 32 (PRIOR ART)

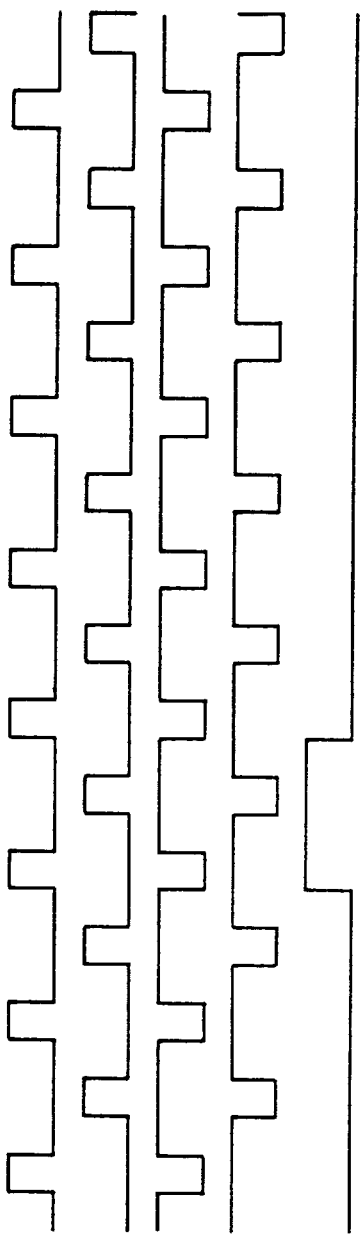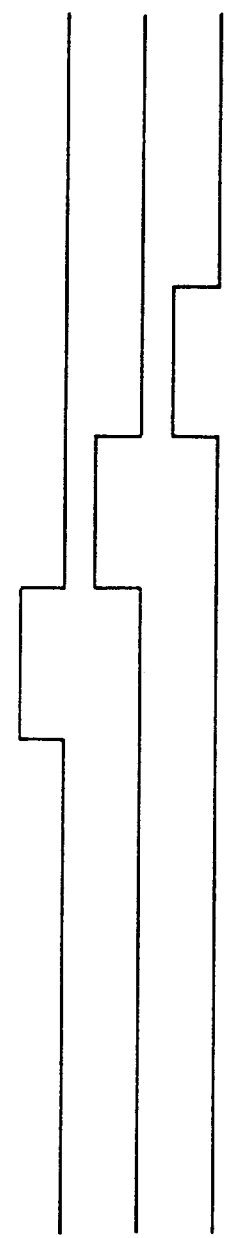
FIG. 33A Φ1
FIG. 33B Φ2
FIG. 33C /Φ1
FIG. 33D /Φ2
FIG. 33E ΦST
FIG. 33F ΦSR1
FIG. 33G ΦSR2
FIG. 33H ΦSR3
(PRIOR ART)

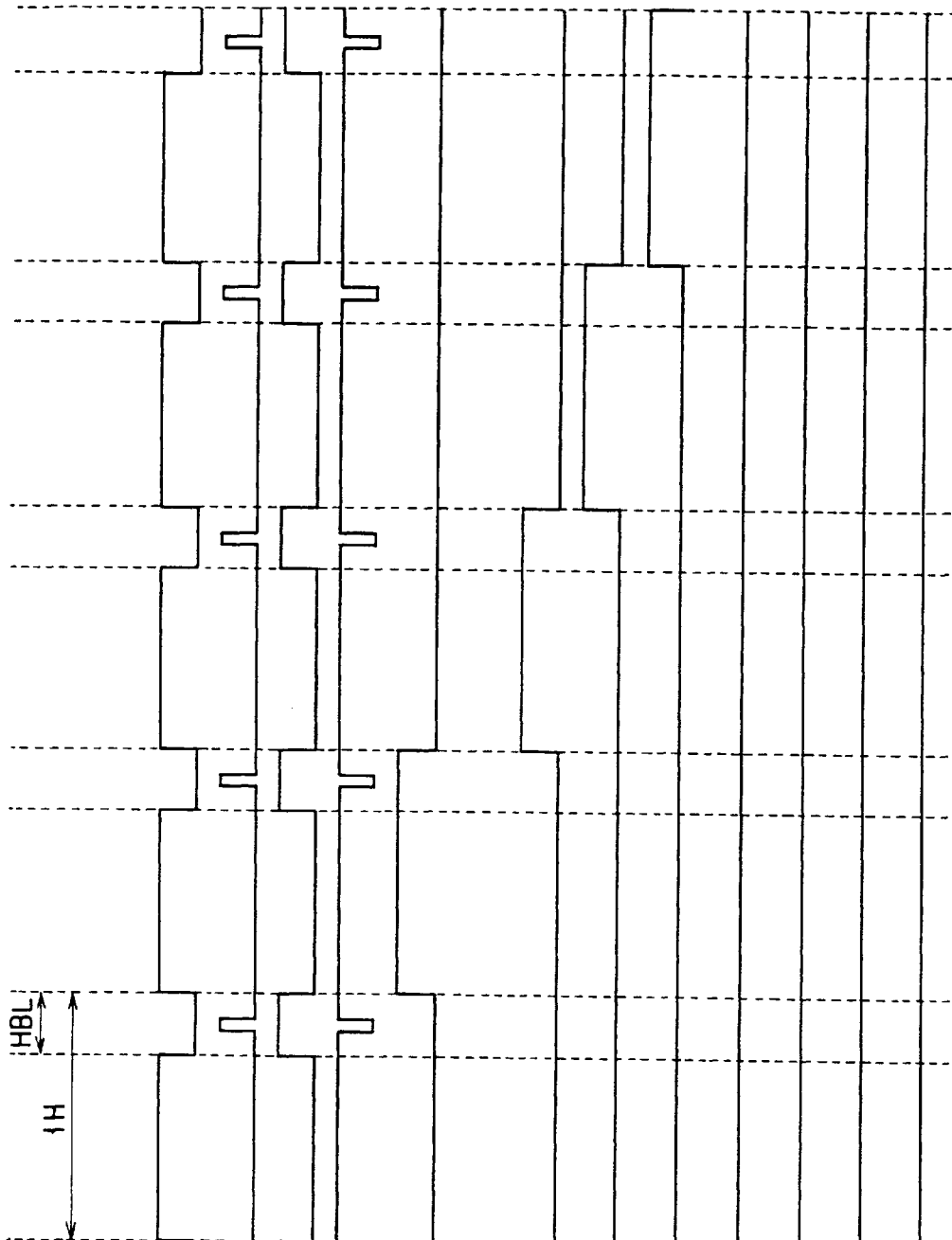

IMAGE PICKUP APPARATUS CAPABLE OF READING IN OPTIONAL READING MODE

BACKGROUND OF THE INVENTION

The present invention relates to an image pickup apparatus and its driving method.

Firstly, description is given on the first related art. Conventionally, there have been proposed various systems for driving an image pickup apparatus. For example, there is known a method of driving an image pickup apparatus in a horizontal direction and vertical direction by using a scanning circuit utilizing a shift register. An example of constituting an image pickup apparatus utilizing such a driving system is shown in FIG. 30. The image pickup apparatus of such constitution comprises a pixel 1101 comprising the photoelectric conversion elements arranged in a two-dimensional array form, a horizontal selection line 1102 provided in coordination with the pixels 1101 arranged in the row direction of the two-dimensional arrays, a horizontal scanning circuit 1105 for selection of row, a horizontal selection switch 1103 provided in coordination with the horizontal selection line 1102, an output signal line 1104 connected commonly with the horizontal selection switch 1103, a horizontal selection line 1106 provided in coordination with the pixel 1101 arranged in the line direction of the two-dimensional arrays, and a vertical scanning circuit 1107 for selection of line, and is constituted to be driven by the sequential application of the driving clock to the horizontal scanning circuit 1105 and the vertical scanning circuit 1107.

With respect to the constitutions of the horizontal scanning circuit 1105 and the vertical scanning circuit 1107, there is known, for example, one made by utilizing a clock type CMOS shift register by connecting the clock type inverters in series. An example of the constitution of the shift register is shown in FIG. 31. In FIG. 31, the part 1108 is a first clock type inverter, and 1109 is a second clock inverter. The first and second clock type inverters 1108 and 1109 are connected in series to constitute a shift register unit 1110, and a large number of shift register units 1110 are connected in series to constitute a shift register, i.e. a scanning circuit. This can be represented in a schematic symbol as in FIG. 32.

FIGS. 33A–33H are timing charts for illustrating the operations. The clock is in two phases of $\Phi 1$ and $\Phi 2$. By application of the start pulse $\Phi ST$ to the input of the shift register unit 1110, $\Phi SR1$, $\Phi SR2$, $\Phi SR3$, . . . are sequentially outputted from the output terminals of the shift register units 1110, in synchronization with the start-up of the clock $\Phi 1$. In FIGS. 31, 33C, and 33D, /$\Phi 1$ and /$\Phi 2$ show the inverted clocks of the $\Phi 1$ and $\Phi 2$.

Next, the timing charts to show a driving examples in the case of using the shift register of the above constitution for the vertical scanning circuit 1107 are shown in FIGS. 34A–34L. In FIGS. 34A–34L, $\Phi V1$, $\Phi V2$, and $\Phi VST$ correspond to $\Phi 1$, $\Phi 2$, and $\Phi ST$ in the shift register unit 1110 stated above, and /$\Phi V1$, /$\Phi V2$ show the inverted clocks of $\Phi V1$, $\Phi V2$. Further, $\Phi SR1$, $\Phi SR2$, $\Phi SR3$, . . . are used as the vertical selection pulses for selecting the line directional lines of the two-dimensional array. In FIGS. 34A–34L, the pulses for driving the vertical scanning circuit 1107 are the two phases of $\Phi V1$ and $\Phi V2$., and, by the application of the start pulse $\Phi VST$, the vertical selection pulses $\Phi SR1$, $\Phi SR2$, $\Phi SR3$, . . . are sequentially outputted in synchronization with the start-up of the clock $\Phi V1$. In FIGS. 34A–34L, in case of the high levels of the vertical selection pulses $\Phi SR1$, $\Phi SR2$, $\Phi SR3$, . . . mean that the pixels of the corresponding lines are selected. Also, the period from the falling of the $\Phi V1$ to the starting-up of the $\Phi V1$ is the horizontal blanking period (HBL). As shown in FIG. 34A–34L, by applying $\Phi V1$ and $\Phi V2$ once each, the vertical selection pulses $\Phi SR1$, $\Phi SR2$, $\Phi SR3$, . . . are sequentially transferred to drive the pixels.

Hereinafter, the second related art will be described. In an image pickup apparatus for shooting the object in high precision, as the number of pixels of the image pickup device increases, the driving frequency of the image pickup device is required to be increased. For example, the driving frequency of the image pickup device used in HDTV (High Definition Television) reaches 74.25 MHz. In practice, it is difficult to make an image pickup device of such high frequency (high speed), and the manufacturing cost of a circuit for processing data at a high speed is high. Accordingly, conventionally, in an image pickup apparatus for recording high precision still images, the field rate is lowered, and the image data of one field or one frame portion is read out at relatively low speed and recorded.

FIG. 35 is a block diagram showing an example of constitution of an image pickup apparatus relating to the second related art. In this constitution example, an object is focused by the lens 1201 on the CCD (Charged Coupled Device) image pickup device 1202 and photoelectric conversion is performed. This CCD image pickup device 1202 is driven by the timing pulse generated from the driving part 1203. The image data read out from the CCD image pickup device 1202 is provided with signal processing such as a gain adjustment in the signal processor 1204, after which it is converted into digital data by the non-illustrated analog/digital converter (hereinafter to be referred to as A/D converter) and outputted.

The recorder 1205 is to record the digital data as still images, and is constituted by various recording media such as the semiconductor memory. The display signal processor 1206 is to output the above digital data by converting into the standard television signal. It is constituted by a synchronous signal addition circuit, digital/analog converter (hereinafter to be referred to as D/A converter), and the like. The system controller 1207 is to make sequential control of the whole image pickup apparatus, and is constituted by microcomputer and the like. The trigger switch 1208 is a shutter button to be operated when the operator desires to take in a still image.

Next, the operation of the image pickup apparatus constituted as above is explained. When the operator depresses the trigger switch 1208, the system controller 1207 detects the said depression. At this time, the system controller 1207 sends the exposure starting and exposure ending timing signals to the driver 1203, and sends the recording start timing signal to the recorder 1205. The driver 1203 generates, on receipt of the exposure starting and ending timing signals, a timing pulse necessary for exposure and reading out in the CCD image pickup device 1202. The image signal read out by the CCD image pickup device 1202 on the basis of this timing is provided with the predetermined processing in the signal processor 1204 and then memorized in the recorder 1205.

At this time, the driving frequency of the CCD image pickup device 1202 is about 10–20 MHz. Assuming that this CCD image pickup device 1202 is constituted by the high pixel sensor of horizontal 2048×vertical 2048 pixels and its driving frequency is 10 MHz, it means that the time of 0.4 second is required to read out the image data of one picture (1 frame) from the said CCD image pickup device 1202. Namely, the frame rate becomes about 2.5 frames/second.

Prior to this recording operation, for adjusting the focal length or image angle to the object, the operator monitors the object with the non-illustrated display apparatus connected to the output side of the display signal processor 1206. During this monitoring, the driver 1203 carries out continuously the exposure and reading out in the CCD image pickup device 1202. The read out image data are provided with the predetermined signal processing with the signal processor 1204 and inputted to the display signal processor 1206. And, the display signal processor 1206 thins out the inputted image data, and stores the image data after thinning out in the own memory for display at a predetermined rate. The recorder 1205 reads out the image data stored in the memory for display in order to convert it into a standard television signal, and outputs it after converting into analog signal by adding a synchronous signal thereto.

Hereinafter, the third related art is explained. The color solid image pickup device in the image pickup apparatus is utilized in various image apparatuses including the video camera for recording moving pictures and electronic still camera for taking still images, and the like.

In recent years, due to the progress of the semiconductor techniques, the color solid image take-up devices with several million pixels have been developed and practically used in the electronic still cameras which require high resolution. However, even such high resolution cameras with the resolution in excess of several million pixels may be required to have a capacity to record moving pictures (not necessarily having high resolution). However, such high resolution cameras are provided for still picture, and they are not able to take the moving pictures. It is because of the fact that, in proportion to the increase in the number of the pixels the time required for the color solid image pickup device to reading out the signal increases.

In order to settle this problem, hitherto there has been proposed a technique to make reading out with substantially reduced pixels by such means as to set the reading out frequency of the color solid image pickup device higher in the case of taking moving pictures than in the case of taking still pictures or to thin out the signals of the color solid image pickup device.

The problematic points of the first, second, and third related techniques as described above are explained below.

In the image pickup apparatus relating to the first related technique above, in the conventional driving method using a shift register for sequentially transmitting the selected pulses, the following points occur. Namely, in the image pickup apparatus of the constitution as shown in FIG. 30, each unit of the vertical scanning circuit 1107 corresponds one by one to the vertical selection line group 1106 provided in coordination with the pixel 1101 which is a photoelectric conversion element arranged in the line direction. Therefore, when the image pickup apparatus having the constitution as shown in FIG. 30 is driven in the driving method as described above, only the non-interlace driving can be made, so that the camera system using this image pickup apparatus is usable solely for the non-interlace application. On the other hand, in order to realize the interlace scanning, there is a scanning system as disclosed in Japanese Patent Publication (Unexamined) No. 5-300433/1993 applied by the applicant of the present invention. However, such a system involves a problem of increased number of clock groups to be applied to the scanning circuit.

In the image pickup apparatus utilizing the second related technique stated above, the frame rate of the image data inputted to the display signal processor 1206 is about 2.5 frames/second. Here, even assuming the frame rate of the standard television signal outputted is 30 frames/second which is based on the NTSC (National Television System Committee) system, it follows that the same image is outputted from the display signal processor 1206 for the duration of 0.4 second until the image data of the memory for display is re-written.

Accordingly, in the image pickup apparatus made in respect to the second related technique as stated above, in monitoring an object with a display unit for the purpose of focus adjustment or image angle setting, because of the slow frame rate for the re-writing of the image data, delay of response is caused to give a problem of poor convenience of use.

Also, according to the technique to change over the reading out frequency of the signal of the image pickup device of the image pickup apparatus to read out in a high frequency relating to the third related technique, when the required resolution becomes high and the driving frequency becomes high, various problems are involved in the point of the practical use with respect to the response characteristic of the circuit and power consumption.

For example, the driving frequency of the color solid image pickup device having 2-million pixels (2000×1000) for high vision is 74 MHz, and the driving frequency of the color solid image pickup device having 4-million pixels (2000×2000) becomes extremely high frequency of as high as 148 MHz.

As the color difference sequential system or Bayer system which is generally adopted in the color filter layout adopts repetition of pixel arrangements in the primary unit of 8 pixels of 2 (horizontal)×4 (vertical), for example, in case of the thinning of the pixels to $½^n$ (n: natural number) in horizontal and vertical numbers, only the signal of the specified color is read out, and no color image pickup can be made.

BRIEF SUMMARY OF THE INVENTION

Accordingly, an object of the present invention is to provide an image pickup apparatus with which reading in optional reading style can be made, having the characteristics of primarily to drive the image pickup apparatus in a non-interlace mode and then in an interlace mode, secondly to drive the image pickup device in either mode of block mode or skip mode in starting up the apparatus, and thirdly to switch over between the mode of driving by thinning the electric signals stored on the pixels and the mode of driving without thinning.

In order to attain the above object, the image pickup apparatus according to the first aspect of the present invention is an image pickup apparatus for picking up an object comprising: an image pickup device formed by arranging the photoelectric conversion elements constituting pixels in two-dimensional directions, a reading out circuit for reading out from the image pickup device an electric signal obtained by photoelectric conversion with the image pickup device, selecting means for selecting from a plurality of reading out modes a reading out mode of the reading out circuit in carrying out reading of the electric signal from the image pickup device, and memory means in which reading out positions of the image pickup device are stored respectively in correspondence with the plurality of reading out modes, so that the reading out circuit reads out the electric signals from the image pickup device based on a reading out position corresponding to the reading out mode selected from the plurality of reading out modes by the selecting means out of the reading out positions of the image pickup device stored in the memory means in correspondence with the plurality of reading out modes.

Also, according to the image pickup method relating to the second aspect of the present invention, an image pickup method for picking up an object comprises: a reading out step for reading out from the image pickup device the electric signal obtained by photoelectric conversion by the image pickup devices formed by arranging pixel-constituting photoelectric conversion elements in two-dimensional directions and a selection step for selecting a reading out mode for reading out the electric signal from the image pickup device in the reading out step out of a plurality of reading out modes, the reading out step reading out the electric signals from the image pickup device based on a reading out position corresponding to the reading out mode selected from the plurality of reading out modes by the selecting means out of reading out positions of the image pickup device stored respectively in the memory means in correspondence with the the plurality of reading out modes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a constitution view showing the image pickup apparatus for illustrating the second embodiment;

FIG. 15 is a flow chart to show the start-up process in the image pickup apparatus according to the fourth embodiment of the present invention;

FIG. 16 is a flow chart to show the process of the whole pixel scanning of the image pickup apparatus according to the fifth embodiment of the present invention;

FIG. 17 is a flow chart to show the block scanning process of the image pickup apparatus according to the fifth embodiment of the present invention;

FIG. 23 is a flow chart to show the process of the whole pixel scanning of the image pickup apparatus according to the seventh embodiment of the present invention;

FIG. 24 is a flow chart to show the process of the whole pixel scanning of the image pickup apparatus according to the eighth embodiment of the present invention;

FIGS. 27A and 27B are the views to show an example of the color filter according to the ninth embodiment of the present invention;

FIGS. 28A and 28B are the views to show an example of the color filter according to the ninth embodiment of the present invention;

FIGS. 29A and 29B are the views to show an example of the color filter according to the tenth embodiment of the present invention;

FIG. 31 is a circuit constitution view to show an example of constitution of a general shift register;

FIG. 32 is a schematic diagram to show the shift register shown in FIG. 31 by using the marks;

FIGS. 33A through 33H are the timing charts for illustrating the operation of the shift register shown in FIGS. 31 and 32;

FIGS. 34A through 34L are the timing charts for illustrating the operation of the conventional image pickup apparatus shown in FIG. 30.

DETAILED DESCRIPTION OF THE INVENTION

Figure 1:
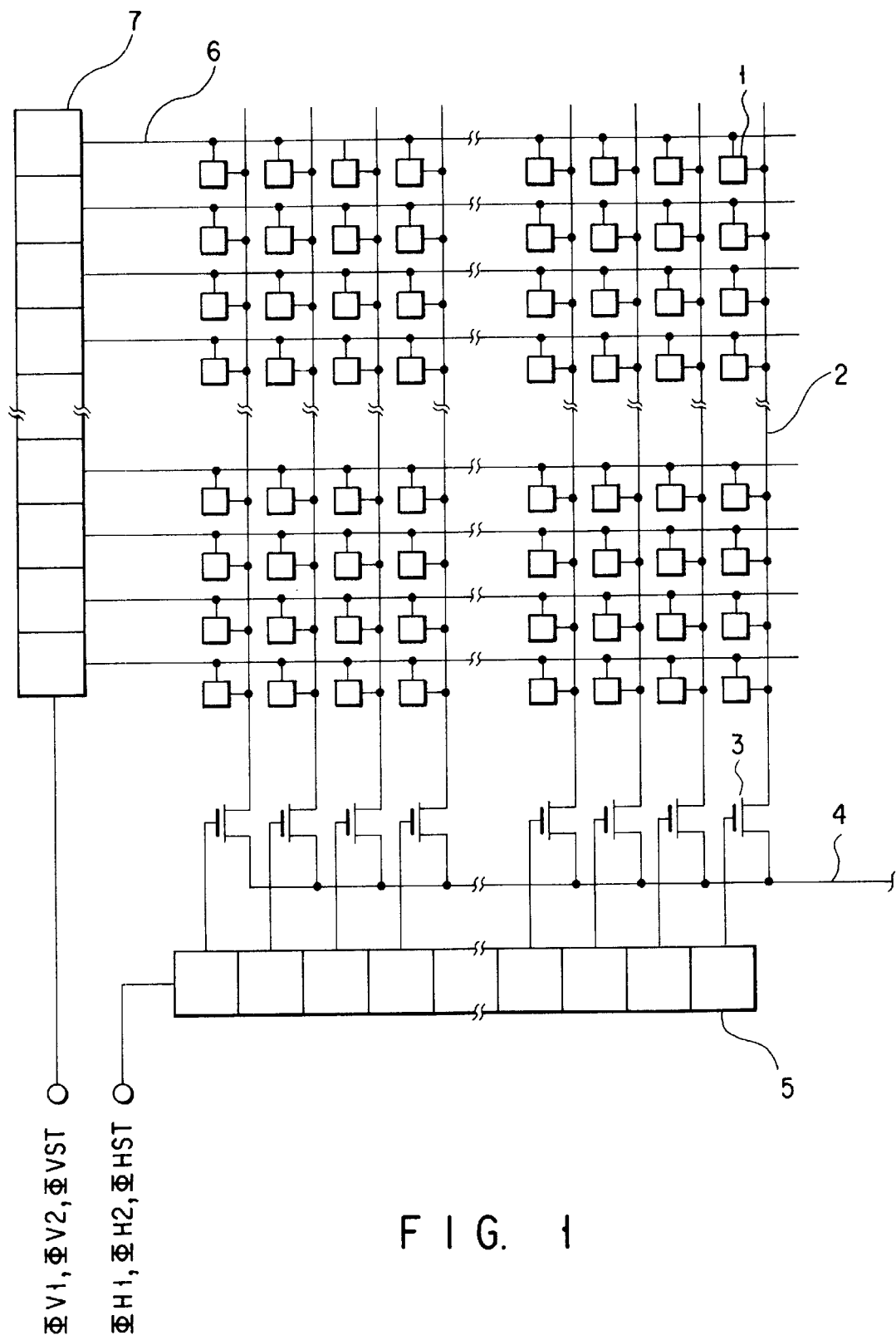
FIG. 1 is a constitution view to show the image pickup apparatus for illustrating the first embodiment of the present invention.
Figure 30:
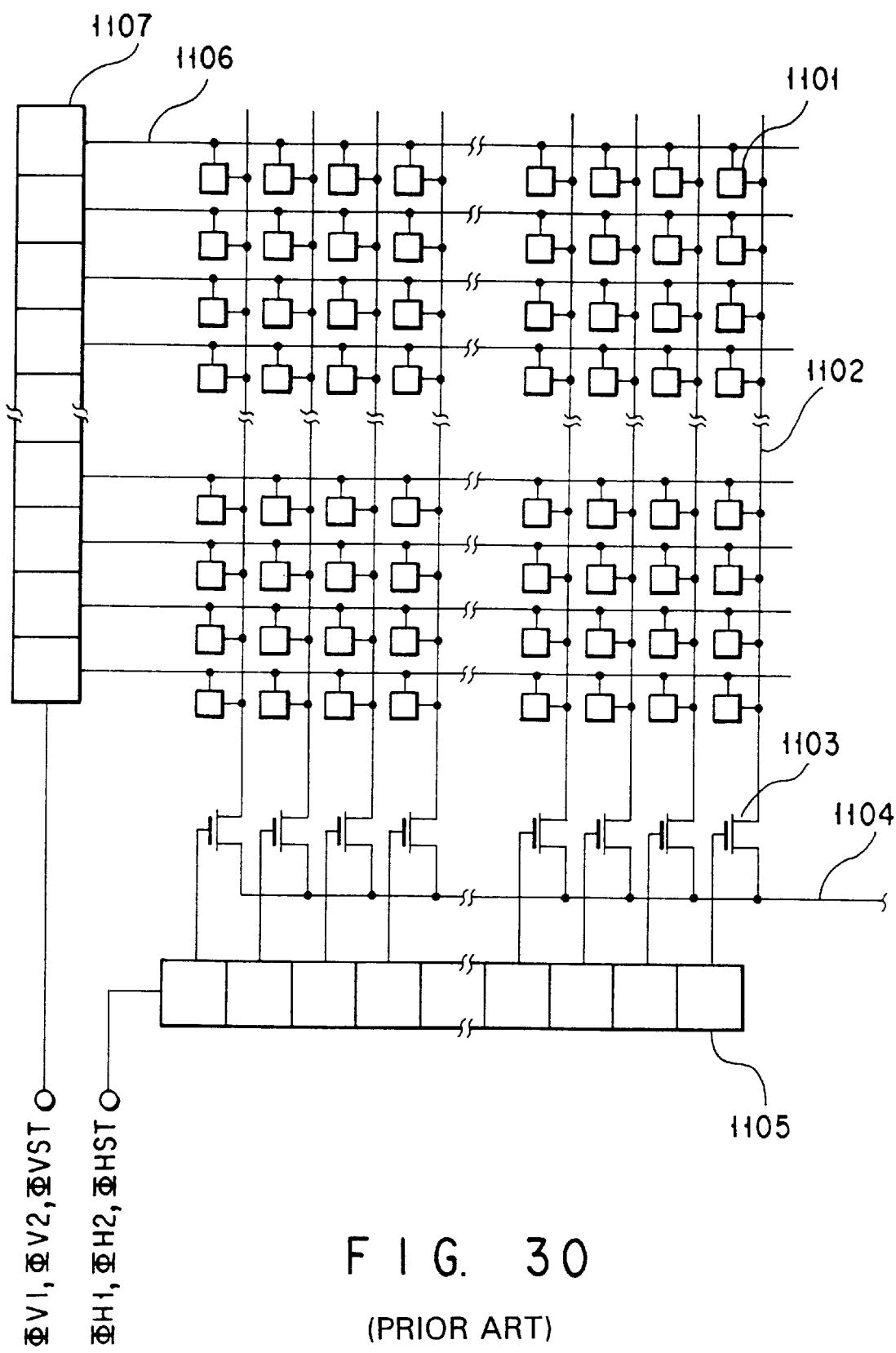
FIG. 30 is a view to show an example of constitution of the image pickup apparatus according to the first related technique.
Figure 35:
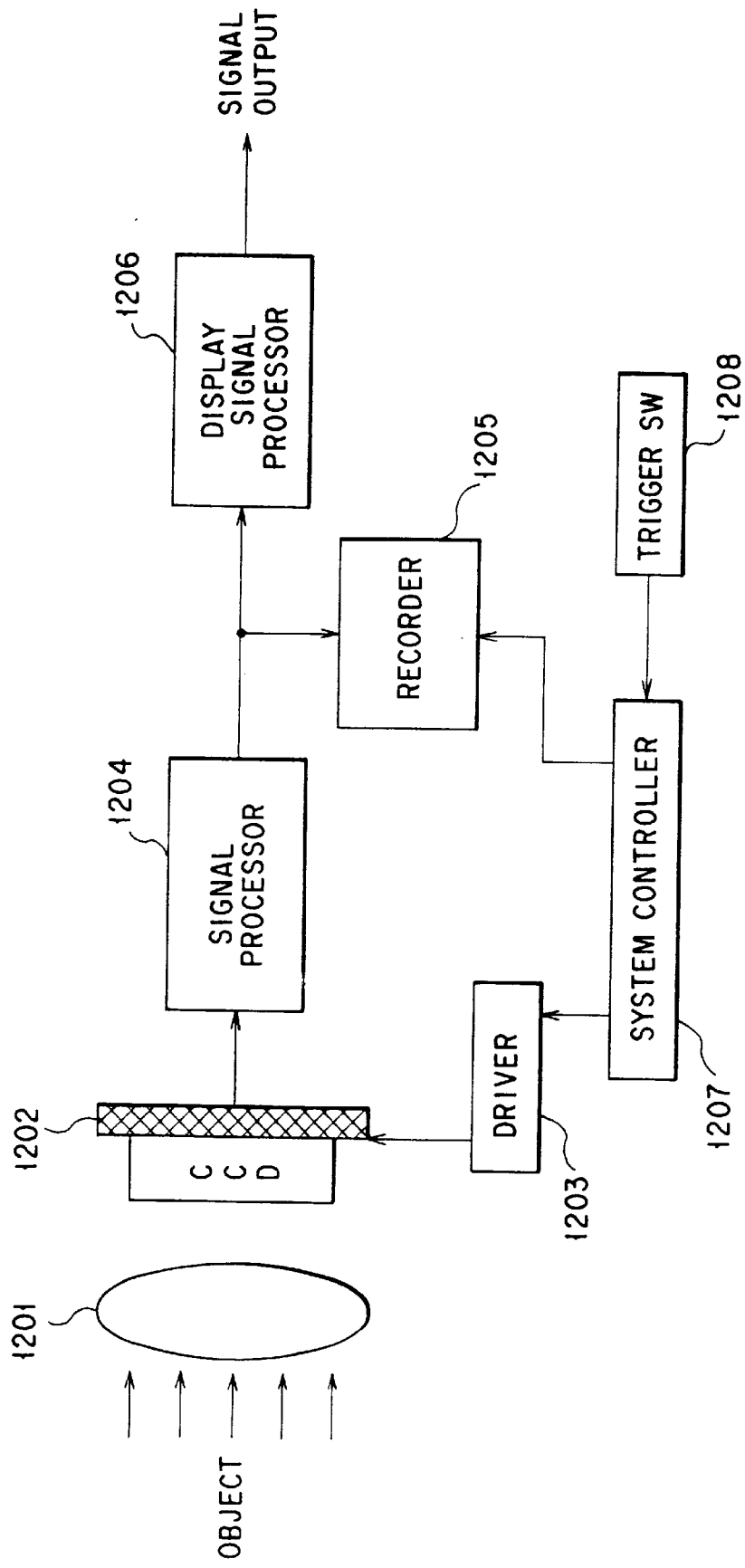
FIG. 35 is a block diagram to show the whole constitution of the image pickup apparatus according to the second related technique.

Hereinafter, the embodiments of the present invention will be explained. FIG. 1 is a schematic block constitution view of an image pickup apparatus for illustrating the first embodiment of the present invention, and its main constitution is the same as that of the conventional one shown in FIG. 30. The apparatus comprises a pixel 1 comprising the photoelectric conversion elements arranged in a two-dimensional array form, a horizontal selection line 2 provided in coordination with the pixels 1 arranged in the row direction of the two-dimensional arrays, a horizontal scanning circuit 5 for selection of row, a horizontal selection switch 3 provided in coordination with the horizontal selection line 2, an output signal line 4 connected commonly with the horizontal selection switch 3, a horizontal selection line 6 provided in coordination with the pixel 1 arranged in the line direction of the two-dimensional arrays, and a vertical scanning circuit 7 for selection of line, and is constituted to be driven in the horizontal scanning direction (main scanning direction) and the vertical scanning direction (sub-scanning direction) by the sequential application of the driving pulse to the horizontal scanning circuit 5 and the vertical scanning circuit 7. And, the circuit constitution itself of the vertical scanning circuit 7 is of the same constitution as that shown in FIG. 31.

Figure 2:
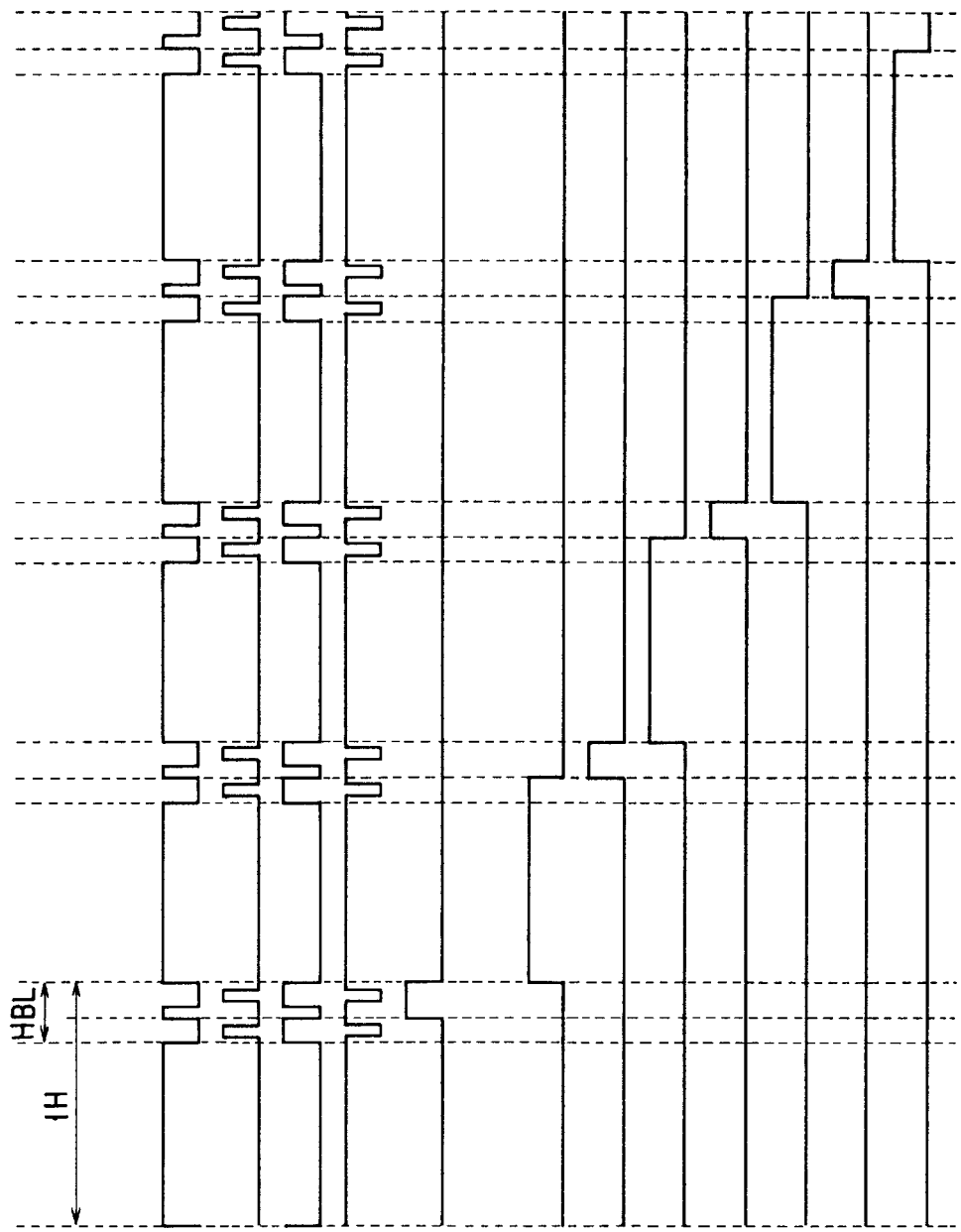
FIGS. 2A through 2L are timing charts for illustrating the modes of operation according to the first embodiment.
Figure 3:
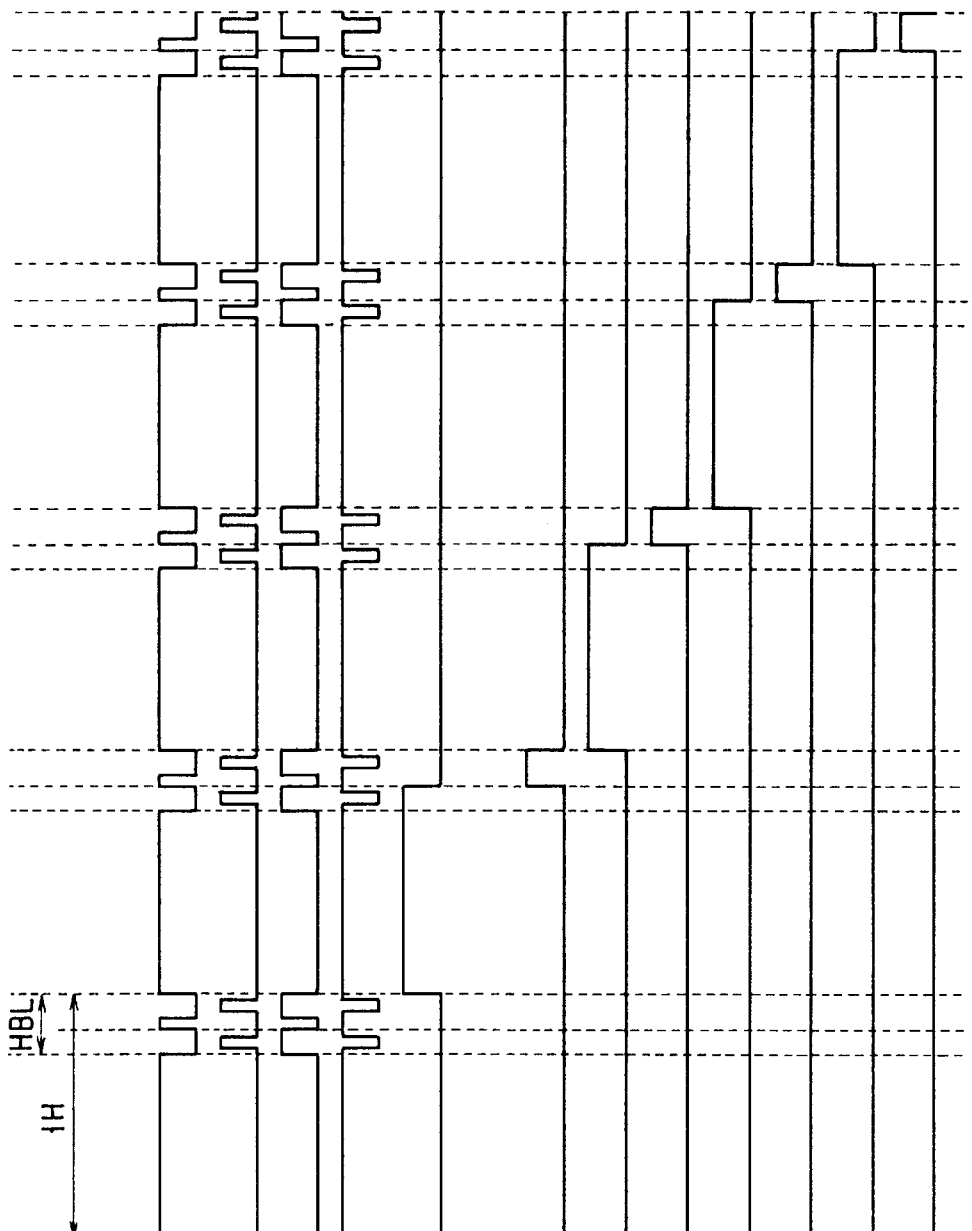
FIGS. 3A through 3L are timing charts for illustrating the other modes of operation according to the first embodiment.

Next, the driving method in the first embodiment style as shown in FIG. 1 is explained by using the timing charts shown in FIGS. 2A–2L and 3A–3L. The clocks for driving the vertical scanning circuit 7 are the two phases of $\Phi V1$ and $\Phi V2$., and, by the application of the start pulse $\Phi VST$ to the input ends of said vertical scanning circuit 7 (corresponding to the input ends of $\Phi ST$ in the foregoing FIGS. 31 and 32), the output signals $\Phi SR1$, $\Phi SR2$, $\Phi SR3$, ... are outputted as the vertical selection pulses from the output terminals of the respective shift register units which constitute the vertical scanning circuit 7 in synchronization with the start-up of the clock $\Phi V1$. In FIGS. 2 and 3, the period shown in 1H, i.e., the two clock portions of $\Phi V1$, are the 1H period, or one period of horizontal scanning. Also, the period shown by HBL is the horizontal blanking period.

As shown in FIGS. 2A–2L, by applying the starting pulse $\Phi VST$ to the previously stated input end of the vertical scanning circuit 7 in the period from the starting up of the $\Phi V1$ of the horizontal blanking period HBL to the next starting up of the $\Phi V1$, and applying the $\Phi V1$ and $\Phi V2$ twice each to the predetermined input ends (corresponding to the input ends of $\Phi V1$ and $\Phi V2$ in the foregoing FIG. 32) of the vertical scanning circuit 7, driving is made so that the position to which the vertical selection pulse is outputted in the vertical scanning circuit 7 is sequentially shifted. By this step, in the period other than the horizontal blanking period HBL of 1H period, i.e., in the effective period of the image signal, the vertical selection pulses $\Phi SR1$, $\Phi SR3$, $\Phi SR5$, ... are sequentially outputted from the output terminal of the odd number order of the vertical scanning circuit 7. Also, the vertical selection pulses $\Phi SR2$, $\Phi SR4$, $\Phi SR6$, ... are sequentially outputted from the output terminal of the even number order of the vertical scanning circuit 7, in the horizontal blanking HBL period, as illustrated.

On the other hand, in the driving shown in the timing chart of FIG. 3A–3L, by applying the starting pulse $\Phi VST$ to the previously stated input end of the vertical scanning circuit 7 in the period from the starting up of the $\Phi V1$ of the effective period of the image signal to the next starting up of the $\Phi V1$, and applying the $\Phi V1$ and $\Phi V2$ twice each to the predetermined input ends in the horizontal blanking period HBL, driving is made so that the position to which the vertical selection pulse is outputted in the vertical scanning circuit 7 is sequentially shifted. By this step, in the period other than the horizontal blanking period HBL of 1H period, i.e., in the effective period of the image signal, the vertical selection pulses $\Phi SR2$, $\Phi SR4$, $\Phi SR6$, ... are sequentially outputted from the output terminal of the even number order of the vertical scanning circuit 7. Also, the vertical selection pulses $\Phi SR1$, $\Phi SR3$, $\Phi SR5$, ... are sequentially outputted from the output terminal of the odd number order of the vertical scanning circuit 7, in the horizontal blanking HBL period, as illustrated.

Thus, by changing over the drive shown in the timing chart of FIGS. 2A–2L and the drive shown in the timing chart of FIGS. 3A–3L at intervals of a field, the vertical selection pulses of $\Phi SR1$, $\Phi SR3$, $\Phi SR5$, ... are sequentially outputted in the first field and $\Phi SR2$, $\Phi SR4$, $\Phi SR6$, ... are sequentially outputted in the second field, in the effective period of the image signals. Accordingly, interlace driving can be realized.

That is to say, in case of driving the vertical scanning circuit 7 in a manner as described above, in the odd number field reading out operation, the pixel on the odd number line is read out by applying the vertical selection pulse so as to select the vertical selection line of odd number line, after which the position in which the vertical selection pulse is outputted in the vertical scanning circuit 7 moves to the position shifted by two lines from the position corresponding to the line selected in the immediately preceding period, and in the even number field reading out operation, the pixel on the even number line is read out by applying the vertical selection pulse so as to select the vertical selection line of even number line, after which the position in which the vertical selection pulse is outputted in the vertical scanning circuit 7 moves to the position shifted by two lines from the position corresponding to the line selected in the immediately preceding period. By this arrangement, by skipping to read the even number lines in the odd number field and skipping to read the odd number lines in the even number field, it becomes possible to subject the solid state image pickup apparatus for non-interlace scanning to interlace driving.

Next, there is explained the second embodiment in the case of applying the present invention to a solid state image pickup apparatus using the CMD (Charge Modulation Device) type light receiving element which is one of the amplification type solid image pickup device. FIG. 4 is a view to show schematically the constitution of the said image pickup apparatus. In FIG. 4, the part 11 is a CMD type light receiving element. In this text, for simplifying the explanation, there is shown one schematically constituting the two-dimensional array by 4 pixels in horizontal direction and 4 pixels in vertical direction, with total 16 pixels. In practice, however, the constitution is not necessarily limited to it. In the solid image pickup apparatus of this constitution using the CMD type light receiving element, there is commonly connected a gate of the line direction CMD type light receiving element 11 to the vertical selection line 6, and there is commonly connected a source of the row direction CMD type light receiving element 11 to the vertical selection line 6.

In case of outputting an image signal from the CMD type light receiving element 11, there is necessitated a pulse in which four voltages of storage voltage VAC for storing a charge in the pixel 1, overflow voltage VOF for discharging the surplus charge of the pixel 1, reading out voltage VRD for reading out the signal from the pixel 1, and reset voltage VRS for discharging the charge of the pixel 1. Firstly, explanation is given on the case of the most popular reading out method. In the non-selection line, during the horizontal effective period of the image signal, the storage voltage VAC is applied, and during the horizontal blanking period, the overflow voltage VOF is applied, and in the selection line, during the horizontal effective period of the image signal, the reading out voltage VRD is applied, and during the horizontal blanking period, the reset voltage VRS is applied. And, it is so arranged that, by sequentially selecting the horizontal selection switch 3 by the horizontal scanning circuit 5 during the horizontal effective period of the image signal, a signal current from the source of the CMD type light receiving element 11 selected in the vertical direction and the horizontal direction, namely, a signal output, is obtained in the output signal line 4.

Figure 5:
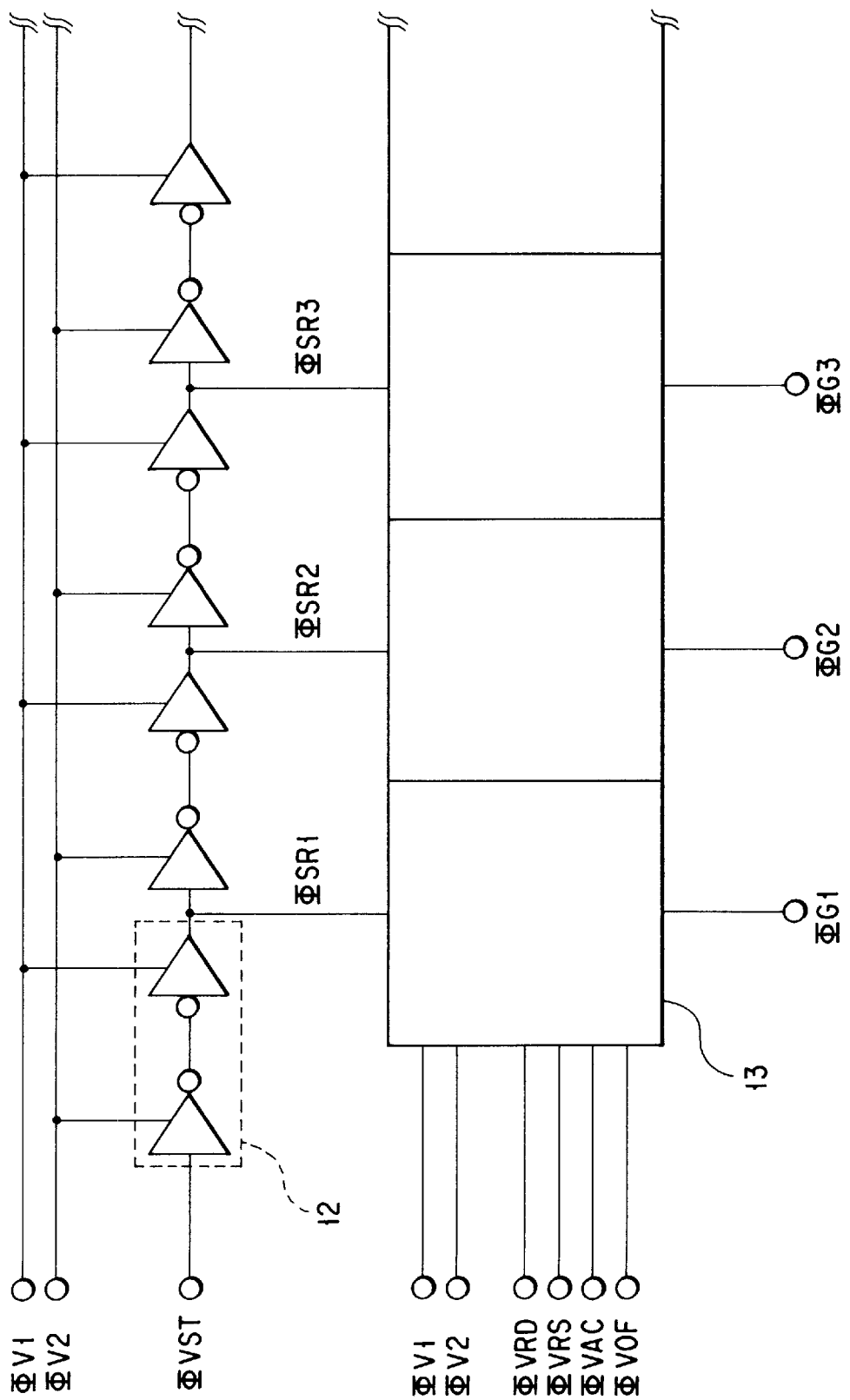
FIG. 5 is a block diagram to illustrate the constitution of the vertical scanning circuit in the image pickup apparatus shown in FIG. 4.
Figure 6:
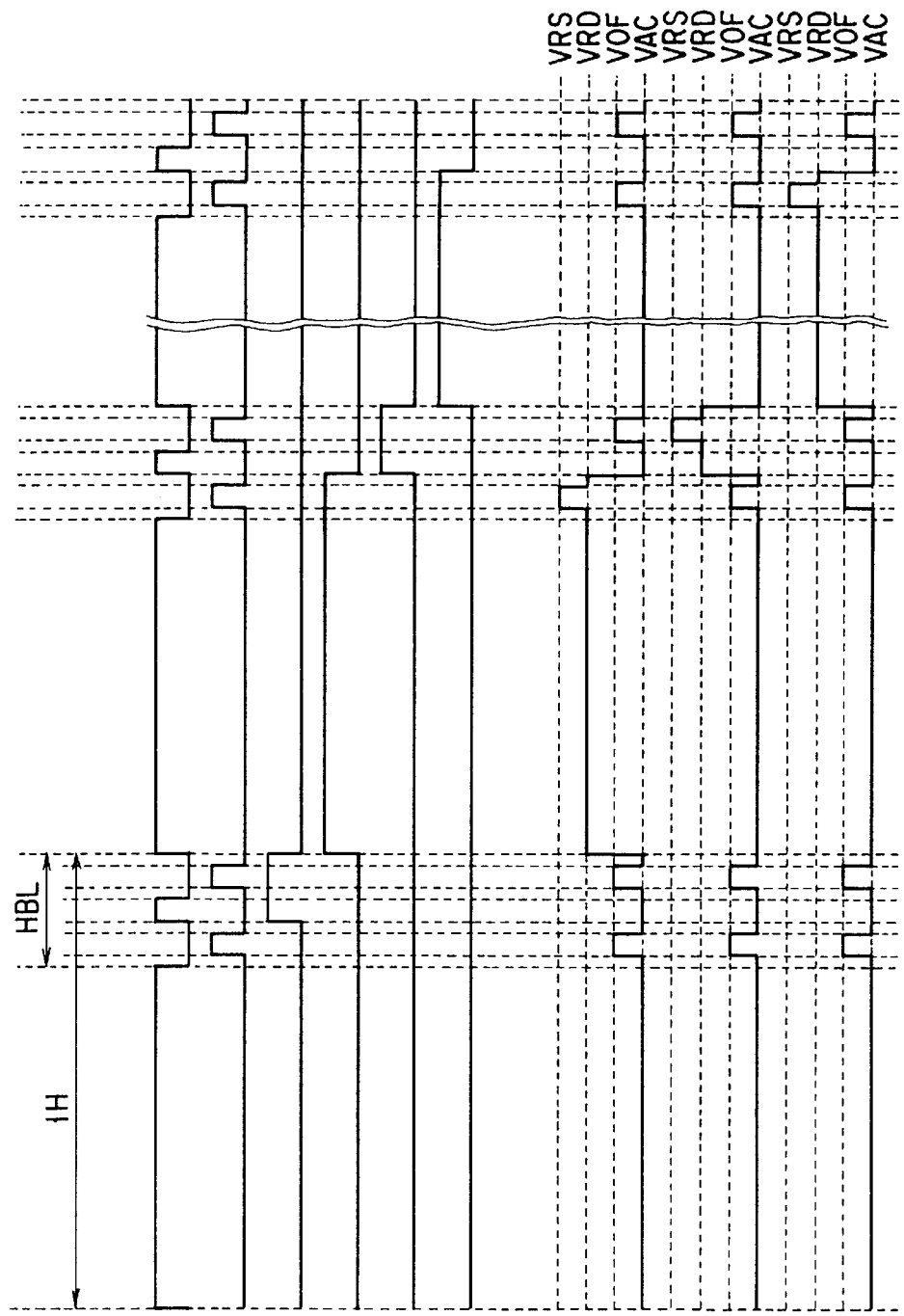
FIGS. 6A–6I are the timing charts for illustrating the operations of the vertical scanning circuits shown in FIG. 5.

Next, an example of constitution to obtain the above four value output in the vertical scanning circuit 7A is shown in FIG. 5. In order to apply the gate voltage mentioned above to the gate of the CMD type light receiving element 11, there are used the circuit in which the theoretical output of two values of selection/non-selection as stated in the first embodiment and the vertical scanning circuit provided with a level mixing unit. In FIG. 5, the part 12 shows a shift register unit, and 13 a level mixing unit. In said level mixing unit 13, the four value pulses to be applied to the gate of the CMD light receiving element 11 can be realized by changing over in time sequence the analog switches of P-type MOSFET, N-type MOSFET, or of combination of P-type and N-type MOSFETs. Further detailed constitution of the level mixing unit 13 is disclosed by the present applicant in Japanese Patent Publication (Unexamined) No. 5-227486/1993. In FIG. 5, the output line of the level mixing unit 13 is connected to the gate line of the CMD-type light receiving element 11 which is the vertical selection line 6. For example, the output of the nth step level mixing unit 13 is driven by the vertical selection pulse ΦSRn from the shift register unit 12 and ΦV1 and ΦV2.

Next, the operation of the vertical scanning circuit 7A of FIG. 4, details of which are shown in FIG. 5, is explained on the basis of the timing chart shown in FIGS. 6A–6I. Here, in the same manner as in the timing chart shown in FIGS. 2A–2L, ΦV1 and ΦV2 are applied in two clocks within the horizontal blanking period. In this vertical scanning circuit 7A, the constitution of the shift register unit 12 is the same as the constitution of the shift register unit which constitutes the vertical scanning circuit 7A in the mode of the first embodiment. From the output of the shift register unit 12, the gate voltage of the CMD type light receiving element 11 becomes such that, when the vertical selection pulse ΦSRn is low level, ΦV1 is low level, and ΦV2 is low level; and when the vertical selection pulse ΦSRn is low level, ΦV1 is high level, and ΦV2 is low level, the output voltage ΦGn becomes the stored voltage VAC; and when the vertical selection pulse ΦSRn is low level, ΦV1 is low level, and ΦV2 is high level, the output voltage ΦGn becomes the overflow voltage VOF; and when the vertical selection pulse ΦSRn is high level, ΦV1 is low level, and ΦV2 is high level, the output voltage ΦGn becomes the reset voltage VRS; and when the vertical selection pulse ΦSRn is high level, ΦV1 is high level, and ΦV2 is low level, and when the vertical selection pulse ΦSRn is high level, ΦV1 is low level, and ΦV2 is low level, the output voltage ΦGn becomes the reading out voltage VRD. By this arrangement, as shown in FIGS. 6A–6I, the gate line of ΦG1 is read out by the reading out voltage VRD in the effective period of image signal, and after it is reset, the gate line of ΦG2 is reset in the horizontal blanking period. And, in the next effective period for the horizontal image signal, after the gate line of ΦG3 is read out by the reading out voltage VRD, it is reset. By this step, the gate line of ΦG2 is reset in the horizontal blanking period HBL, so that the storage of the light signal charge of the CMD type light receiving element 11 connected to said gate line can be of the field storage.

As described above, by driving the vertical scanning circuit 7A, the pixels in the line direction can be shifted while being reset, through the vertical selection line 6, in shifting the line to become the subject of selection to a position shifted by two lines from the line selected in the immediately preceding period, within the horizontal blanking period HBL. When the explained interlace driving is carried out by using the solid image pickup apparatus provided with a vertical scanning circuit 7 having a level mixing unit 13 with the timing charts given in FIGS. 2A–2L and FIG. 3A–3L, the storage can be made in the form of the field storage.

In each embodiment described above, explanation is made on the basis of employing the two clocks for the clock for shifting the position of the line from the line selected in the immediately preceding period to the position of the line to be selected next within the horizontal blanking period HBL, but obviously it is possible to change the number of lines to be skipped to read by modifying the clock numbers to 3 clocks, 4 clocks, and so on. Furthermore, as the present invention is made with special attention paid to the selection condition of pixels in the line direction, there is no restriction in the constitution of the horizontal scanning circuit for sequentially reading out the pixels of the selected lines.

In the second embodiment above, explanation is given on the apparatus using as a pixel the so-called non-destructive reading out photoelectric conversion element which does not discharge the electric charge stored during the signal charge storage period, by providing a reading out condition. However, if a device is of such type that to make a reading out condition itself means to reset the stored electric charge, or one for which the photoelectric conversion element for the so-called destructive reading out is used for the pixel, the reset action in the horizontal blanking period HBL is unnecessary.

As described above, the present embodiment is to provide a method for driving the solid image pickup apparatus which is designed to carry out scanning of a plurality of steps in the row direction within a horizontal blanking period HBL, so as to obtain signals from the pixels at intervals of plural lines out of the whole pixels, and the concrete constitution and clock shape shown in the above embodiment are not limited to them.

As explained on the basis of the above embodiments, according to the present embodiment, a driving to skip reading a plurality of lines in the line direction can be realized in a simple driving method. Also, it is possible to realize a driving to skip reading a plurality of lines in the line direction by carrying out plural times the shifting of the position to which the selection pulse of the vertical selection line is outputted, in a horizontal blanking period, in the form of a simple vertical scanning circuit driving clock group. Also, it becomes possible to drive in an interlace mode an image pickup apparatus for non-interlace use in a simple form of the vertical scanning circuit driving clock group.

In the image pickup apparatuses of the first and second embodiments there are disclosed mainly the constitution of the image pickup part only, but in practice there are provided various circuits having the same functions as the signal processor 104, driver 109, and system controller 108 which are shown in the later-described FIG. 7.

Figure 7:
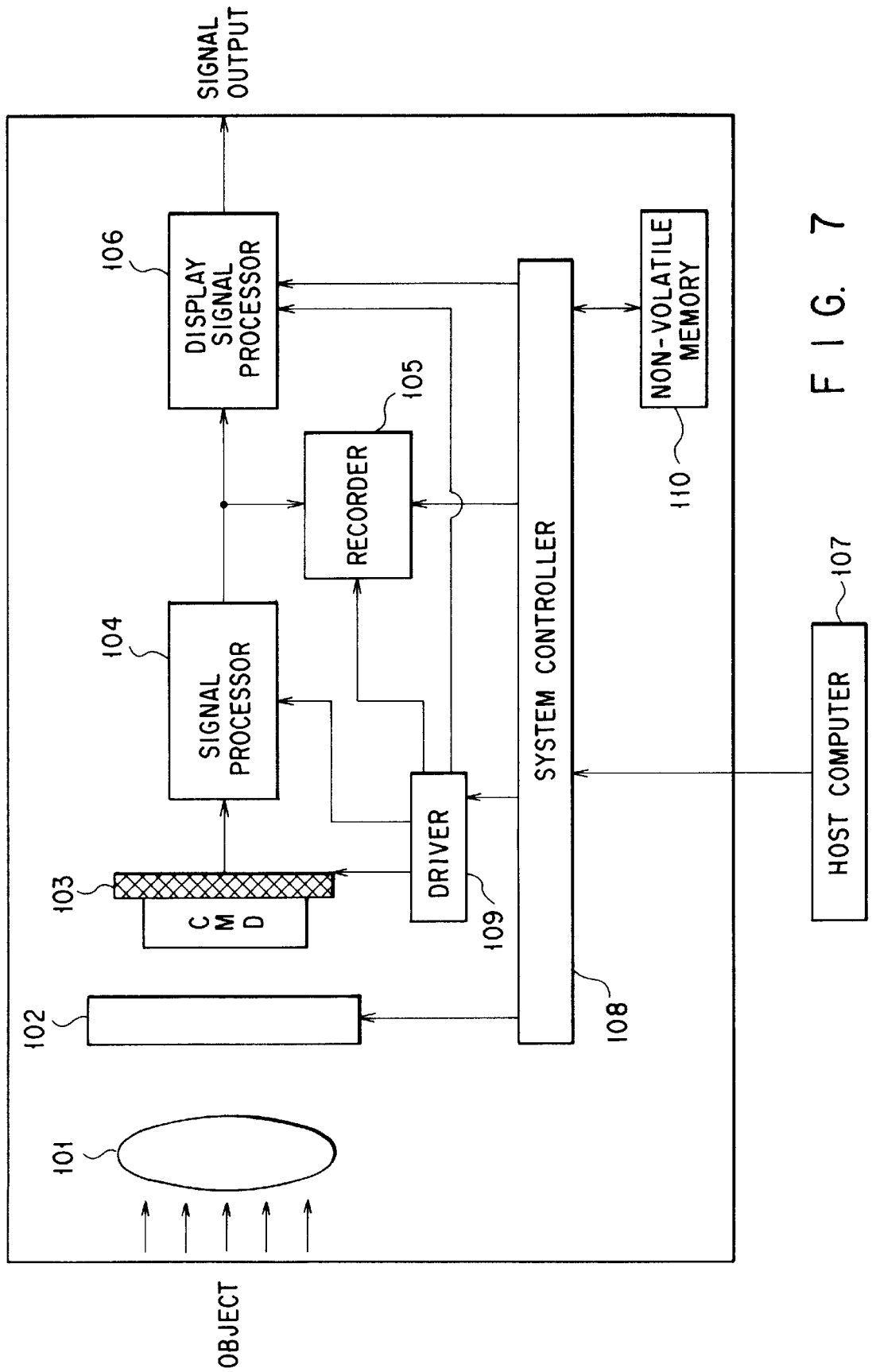
FIG. 7 is a block diagram to show the whole constitution of the image pickup apparatus according to the third to eighth embodiments of the present invention.

FIG. 7 is a block diagram to show the constitution of the image pickup apparatus according to the third to eighth embodiment of the present invention.

The CMD image pickup device 103 carries out exposure, photoelectric conversion, and reading out of signals (analog image signals) based on the light sent through the lens 101 which focuses the image of the object and the shutter 102 which is opened or closed to control the exposure duration. The CMD image pickup device 103 used in this embodiment has a driving frequency of 10 MHz, and the total pixels of 2048 pixels×2048 pixels. In this case, the reading out time of the whole pixels is about 0.4 second.

The CMD image pickup device 103 is driven by the later-described driver. In this case, the CMD image pickup device 103 is driven in one of the driving modes of "block", "skip", and "whole pixel". "Block" is a driving mode for scanning the pixels of a part (predetermined range) of the whole pixels, and "skip" is a driving mode for scanning by thinning the pixels out of the whole pixels. "Whole pixel" is a mode for scanning the whole pixels. In this embodiment, while the driving is under way in the driving mode of "block" or "skip", the processing to obtain motion picture is performed, and in case of the driving in the driving mode of "whole pixel", the processing to obtain still picture is performed.

The signal processor 104 provides the analog image signal read out from the CMD image pickup device 103 with the predetermined signal processing such as the gain adjustment. Also, the signal processor 104 internally contains the non-illustrated A/D converter. This A/D converter converts the analog image signal provided with the processing in the above signal processor 104 into the digital image data. And, the produced digital image data is to be outputted from the signal processor 104.

The recorder 105 is to record the above digital image data as a still image. It is constituted by various recording media such as semiconductor memory. The display signal processor 106 is to convert the above digital image data to a standard television signal and output. It is constituted by, for example, a frame memory for converting the input and output rates, a synchronous signal addition circuit, a D/A converter (not illustrated), and the like.

The thus outputted standard television signal is sent to the non-illustrated display apparatus, and images are shown on the display screen. And, in case of making adjustment of focal distance or image angle setting, the object can be monitored through the display apparatus.

On the other hand, outside this image pickup apparatus, there is provided a host computer 107. The host computer 107 is to be used for the operator to send various commands to the image pickup apparatus. It is constituted by a personal computer and the like. On the host computer 107, the operator is to use the non-illustrated mouse and the like to make various settings and give commands on the display. For example, it is possible to instruct start-up and shut-down to this image pickup apparatus, or to instruct the setting or switching of the driving mode of CMD image pickup device 103. Also, it is possible to make change of setting of the thinning number in respect to the skip scanning, change of the block size concerning the block scanning and change of setting of the position, and the like.

The system controller 108 is to make sequential control of the whole image pickup apparatus, and is constituted by the microcomputer and the like. This system controller 108 self-contains the non-illustrated ROM (Read Only Memory). On the ROM there are stored various kinds of programs to define the procedures of the above sequential controls. The system controller 108 is to meet various kinds of commands from the host computer 107, and execute the prescribed program out of the various programs stored in the ROM, if it is necessary to make sequential control. The host computer 107 and the system controller 108 constitute the reading out mode selection means.

In case of the above sequential control, the system controller 108 acts to send the driving mode signal to show the kind of the driving mode (any of the above-described block scanning, skip scanning, and whole pixel scanning) to the driver 109, or to perform open/close control corresponding to the then ruling driving mode to the shutter, or to make control of the recorder 105 or the display signal processor 106.

The driver 109 as a reading out circuit acts in accordance with the driving mode signal sent from the system controller 108 to generate a timing pulse corresponding to the driving mode shown in the driving mode signal and send it to the CMD image pickup device 103. By this, the CMD image pickup device 103 is to be driven by the above timing pulse. At this time, the driver 109 sends a synchronous signal for taking the processing timing respectively to the signal processor 104, recorder 105, and display signal processor 106.

The non-volatile memory 110 is used to preserve the information showing the kind of the driving mode at the end of the image pickup by the power cut operation or the like. It is constituted by memory medium which can retain the information even when the power is cut.

Figure 8:
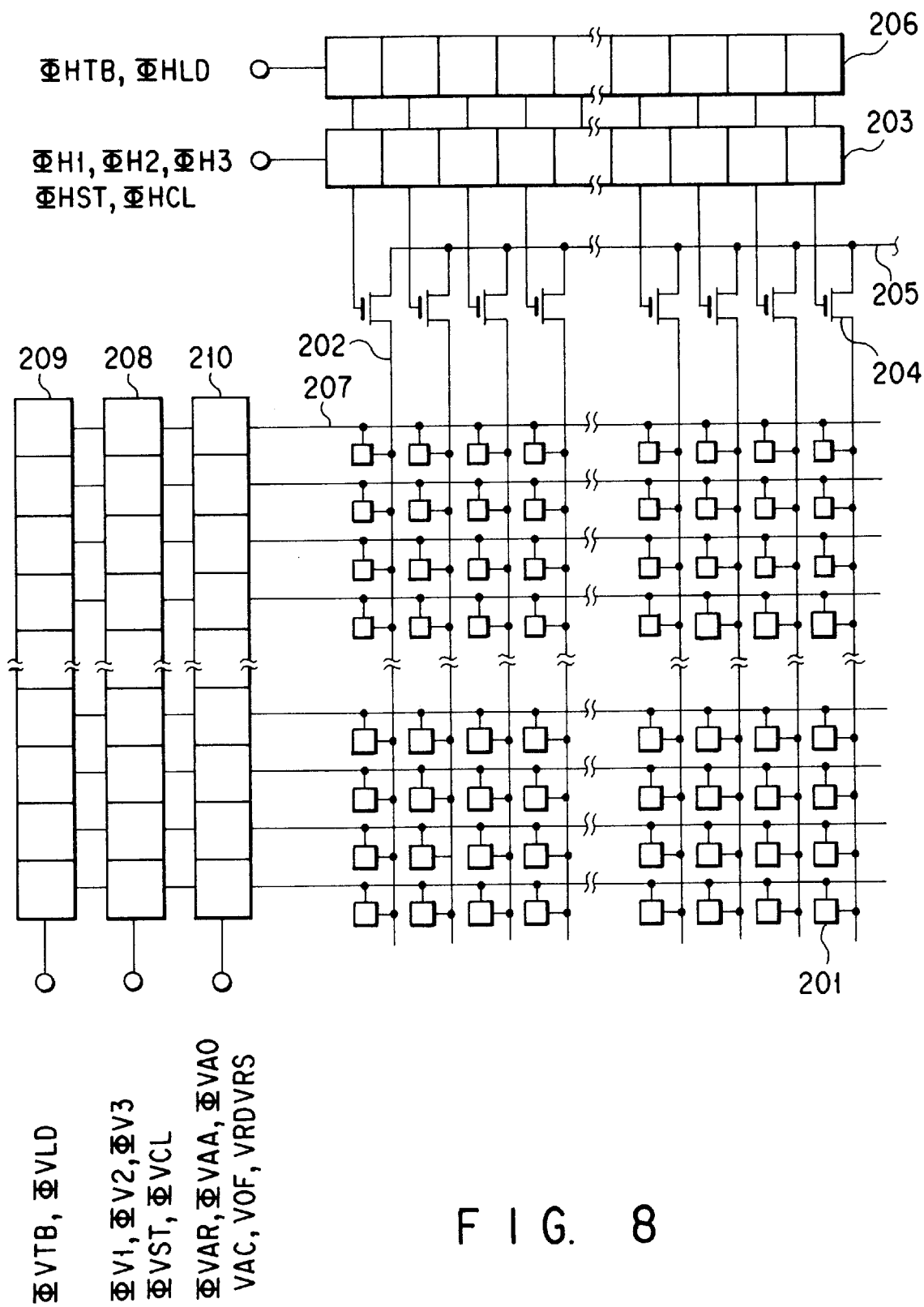
FIG. 8 is a block diagram to illustrate a constitution example of the image pickup device shown in FIG. 7.

FIG. 8 is a view to show the constitution of the CMD image pickup device 103 as described above. In this constitution, the pixel 201, horizontal selection line 202, horizontal scanning circuit 203, horizontal selection switch 204, output signal line 205, vertical selection line 207, and vertical scanning circuit 208, are as explained in the foregoing embodiments (however, the vertical scanning circuit 208 is provided with an additional function that the whole stages of the internal shift register are cleared by the control pulse ΦVCL from outside). Here, the differences are the new provision of a horizontal memory 206 provided in 1:1 correspondence with the horizontal scanning circuit 203, a vertical level mixing circuit 210 provided in correspondence with the vertical selection line 207, and a vertical memory 209 provided in correspondence with the vertical scanning circuit 208.

Hereinafter, explanation will be made only on the newly added portions. The vertical level mixing circuit 210 is a circuit to switch over the potential of the connected vertical selection line 207 at the desired timing. The potentials to undergo switch-over control include the storage voltage VAC, overflow voltage VOF, reading out voltage VRD, and reset voltage VRS as stated in the foregoing embodiments. In the vertical level mixing circuit 210 shown in FIG. 8, ΦVAR, ΦVAA, and ΦVAO are the changeover control pulses. When these pulses are applied, without respect to the condition of the transfer pulse in the vertical scanning circuit 208, the storage potential VAC, overflow voltage VOF, and reset voltage VRS are applied to all pixels 201.

The horizontal memory 206 and vertical memory 209 are provided in 1:1 correspondence with each step of the shift register. They are the memories having the functions to preserve the position information of the transfer pulse of the shift register and to load the preservation information to the shift register, by the control pulse from outside source.

Figure 9:
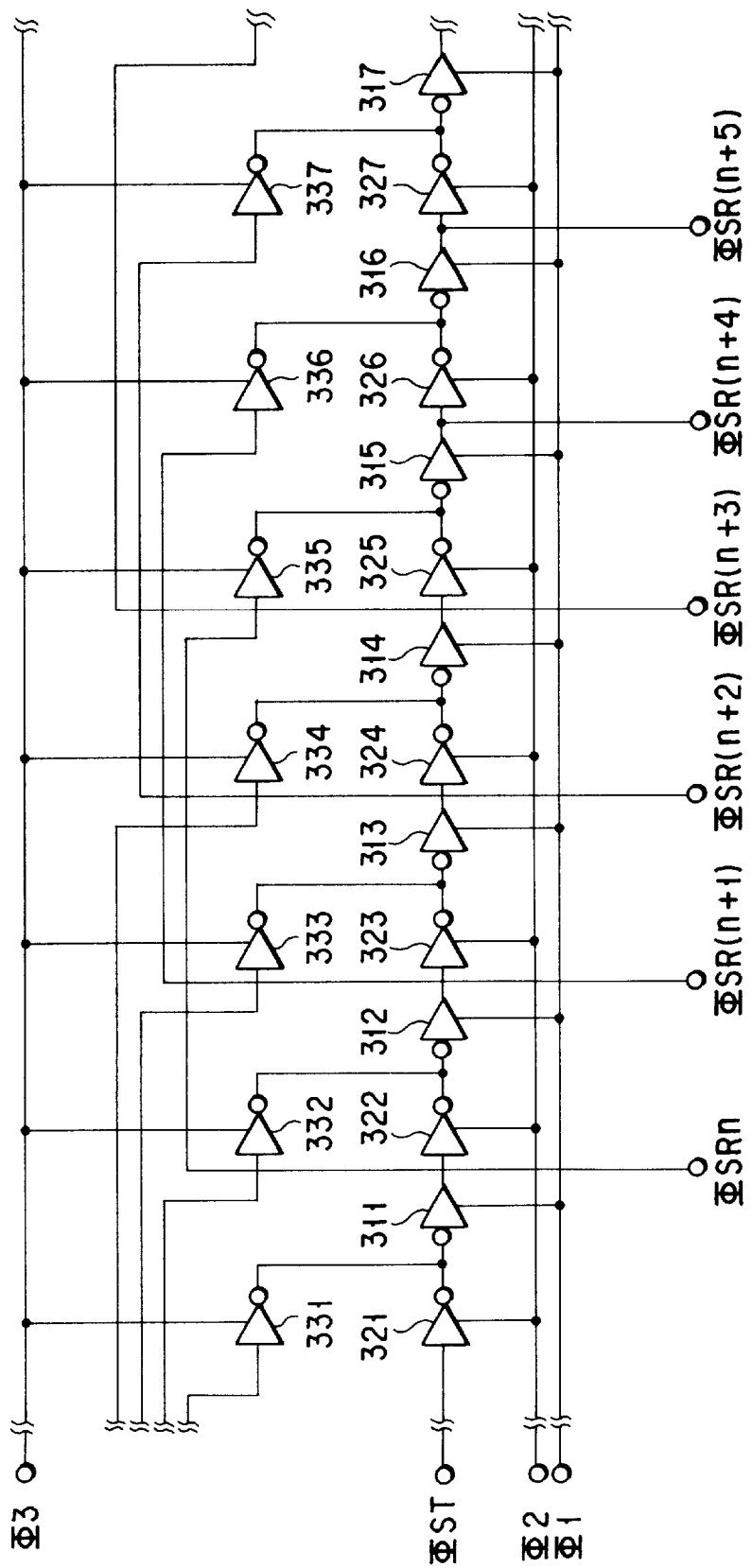
FIG. 9 is a view to illustrate a circuit constitution of a shift register constituting a horizontal scanning circuit and a vertical scanning circuit in the CMD image pickup device as shown in FIG. 8.

FIG. 9 is a view to show the circuit constitution of the shift register which constitutes the vertical scanning circuit 208 and horizontal scanning circuit 203 of FIG. 8.

Next, explanation is given on the operation of the CMD image pickup device 103 constituted as above at the time of scanning the whole pixels. As stated in the embodiment described above, in case of outputting an image signal from the CMD image pickup device 103, as the voltage to be applied to each line of MD pixel 201, there are required the pulses formed by combining the four voltages as described above in time sequence.

Firstly, when the vertical selection pulse (ΦVST) is supplied to the lowest register of the shift register constituting the vertical scanning circuit 208, the vertical selection line 207 at the lowest line is subjected to the read potential (corresponding to the reading out voltage VRD) by the vertical mixing circuit 210. By this, the gates of all pixels 201 in the line direction have the reading voltage through the vertical selection line 207 to complete the preparation for reading out. At this time, each gate potential of all pixels 201 of other lines not selected is converted to the storage potential (VAC) by the vertical level mixing circuit 210. By this step, the signal of the pixel 201 of other line is cut off.

Next, when the horizontal selection pulse (ΦHST) is supplied to the leftist register of the shift registers constituting the horizontal scanning circuit 203, the horizontal selection switch 204 connected to the output of the register is activated. By this step, the signal of the pixel 201 lying at the lowest part of the read potential (corresponding to the reading out voltage VRD) of the pixel 201 of the row connected to the leftist horizontal selection line 202 is read out from the output signal line 205. In the horizontal scanning circuit 203, by sequentially transmitting the horizontal selection pulse (ΦHST) to the right direction by the horizontal driving pulses (ΦH1 and ΦH2), the signal of the pixel 201 at the lowest line of the read potential (corresponding to the reading out voltage VRD) is read out sequentially from the left side.

In the horizontal blanking period HBL after completion of the reading out of all pixels 201, the gate potential of the pixel 201 of the selected line is brought to the reset potential (corresponding to the reset voltage VRS) by the vertical level mixing circuit 210, and the charge of all the pixels 201 of the line connected to the vertical selection line 207 is discharged. Also, in this timing, to the gate of the pixel 201 of the non-selected line, an overflow potential VOF is applied by the vertical level mixing circuit 210, and discharge of the surplus charge is carried out.

On completion of the reading out of the selected line and the reset operation, the vertical scanning circuit 208 sends the vertical selection pulse (ΦVST) sequentially to the upper direction by the vertical driving pulses (ΦV1 and ΦV2), and repeatedly carries out the horizontal scanning operation in repetition. By this step, it becomes possible for the CMD image pickup device 103 to read out sequentially all the pixels 201 from the pixel lying at the left bottom to the pixel lying at the right top.

Next, the operation of the CMD image pickup device 103 at the time of the block scanning is explained.

This block scanning is realized in two modes. One is the designation of the starting position of the block reading out, and the other is the actual reading out.

First, the designation of the starting position of the block reading out is explained. To the horizontal scanning circuit 203 and the vertical scanning circuit 208 respectively, a horizontal selection pulse (ΦHST) and a vertical selection pulse (ΦVST) are applied, which are respectively transmitted to the optional positions at which the block reading out is desired to be started. Here, by the horizontal scanning starting position memorizing pulse (ΦHTB), the condition of the transmission pulse (horizontal selection pulse) of the horizontal scanning circuit 203 is memorized in the horizontal memory 206. Similarly in the vertical scanning circuit 206, by the vertical scanning starting position memorizing pulse (ΦVTB), the condition of the transmission pulse (vertical selection pulse) of the vertical scanning circuit 208 is memorized in the vertical memory 209.

Next, in case of the reading out, by applying a horizontal scanning starting position load pulse (ΦHLD) in place of the horizontal selection pulse (ΦHST) at the time of the scanning of the whole pixels as described above, the starting position information memorized in the horizontal memory 206 is loaded on the horizontal scanning circuit 203, so that the reading out can be made from the memorized position at the time of the designation of the starting position. And, in case of terminating the scanning at an optional position, by applying the horizontal scanning circuit clearing pulse (ΦHCL), the whole steps of the horizontal scanning circuit are cleared, so that the scanning can be terminated at said position. Also, with respect to the vertical scanning circuit 208, by using the vertical scanning starting position load pulse (ΦVLD) and the vertical scanning circuit clearing pulse (ΦVCL), scanning can be made in the same way. By this step, the CMD image pickup device 103 can realize the block reading out from the optional position to the optional position in the applicable photoelectric conversion region.

Next, referring to FIG. 9, the operation at the time of the skip scanning of the CMD image pickup device 103 is explained.

In skip scanning, the shift register is driven not by the driving pulses Φ1, Φ2 but by the driving pulses Φ1, Φ3. As the clock type inverters 331, 332, . . . to which the clock pulse Φ3 is applied are connected to the clock type inverter at 4 step forward, the output signals ΦSRn, ΦSR(n+4), ΦSR(n+8), . . . are sequentially outputted.

By practicing the above driving method on each scanning circuit of horizontal scanning circuit 203 and vertical scanning circuit 208, the skip scanning can be realized. Also, by adding Φ4, Φ5, the shift registers which transit to 8 steps forward and 16 steps forward, and the like can be easily realized. By these means it is possible for the CMD image pickup device 103 to be subjected to skip driving with optional number of pixels. In other words, the thinning rate can be made variable.

Next, the driver 109 of this embodiment shown in FIG. 7 is explained in detail.

Figure 10:
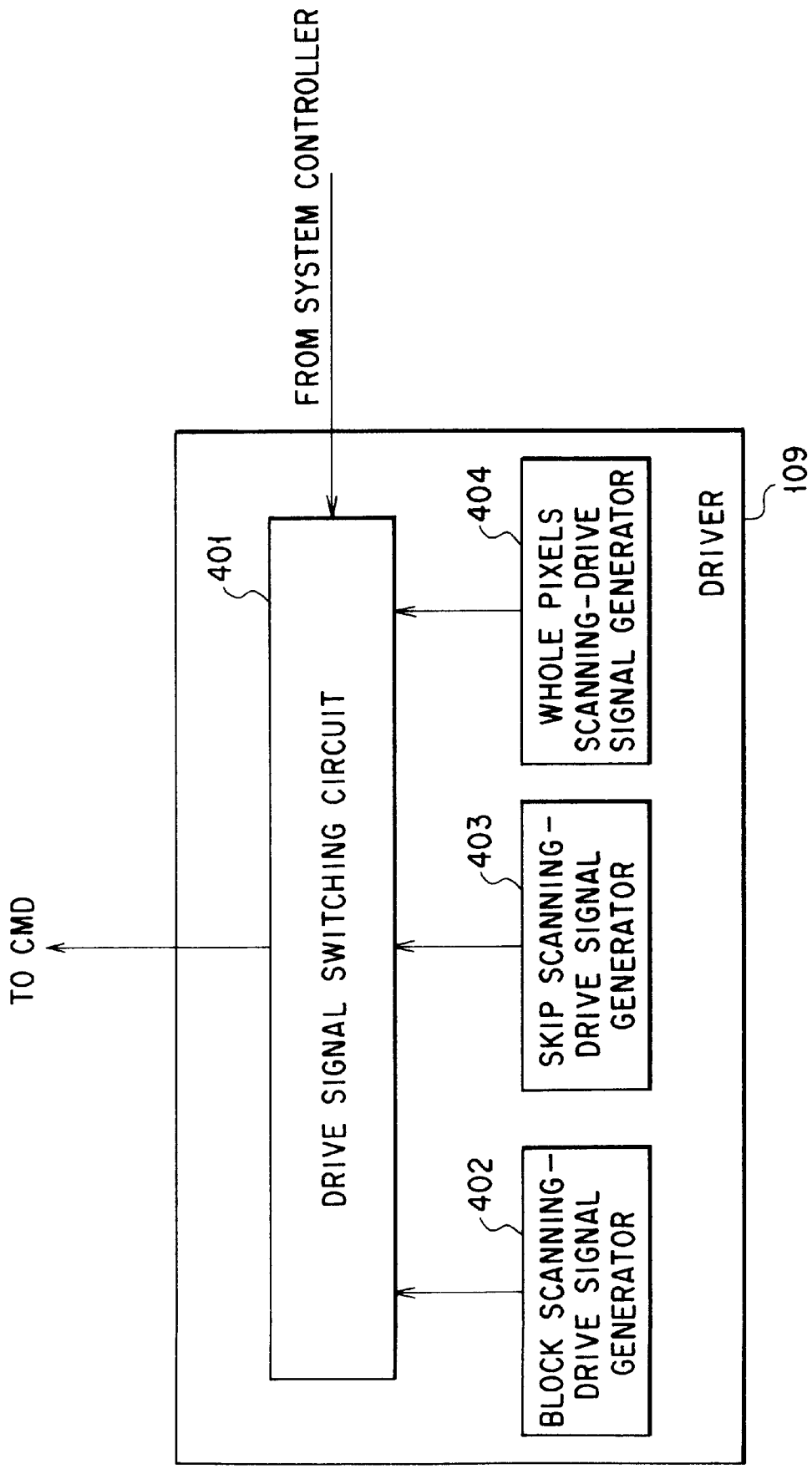
FIG. 10 is a block diagram to show the internal constitution of the driver shown in FIG. 7.

FIG. 10 is a block diagram to show the internal constitution of the driver 109 in FIG. 7. In order to make reading out of the CMD image pickup device 103 described above, the driver 109 is provided with a block scanning drive signal generator 402, a skip scanning drive signal generator 403, and a whole pixel scanning drive signal generator 404 which are respectively coordinate one another. And, in the respective driving signal generator, the above-described horizontal and vertical driving pulses (ΦH1–ΦH3, ΦV1–ΦV3), horizontal and vertical selection pulses (ΦHST, ΦVST), horizontal and vertical scanning circuit clearing pulses (ΦHCL, ΦVCL), horizontal and vertical scanning starting position memorizing pulses (ΦHTB, ΦVTB), and horizontal and vertical scanning starting position loading pulses (ΦHLD, ΦVLD) are produced. Furthermore, the driving signal generators 402, 403, and 404 have the memory means for memorizing the reading out position information of the CMD image pickup device 103 corresponding to the selected reading out mode. Alternatively, the position that is skipped in the reading out operation can also be stored. Also, even in an absolute position, the information relating to the relative position may be memorized. In case of the relative position, the reading out period is memorized. These driving pulses are selected by the driving mode signal from the system controller 108 at the driving signal changeover circuit 401 to output the driving pulse signal coordinate with the driving mode.

Figure 11:
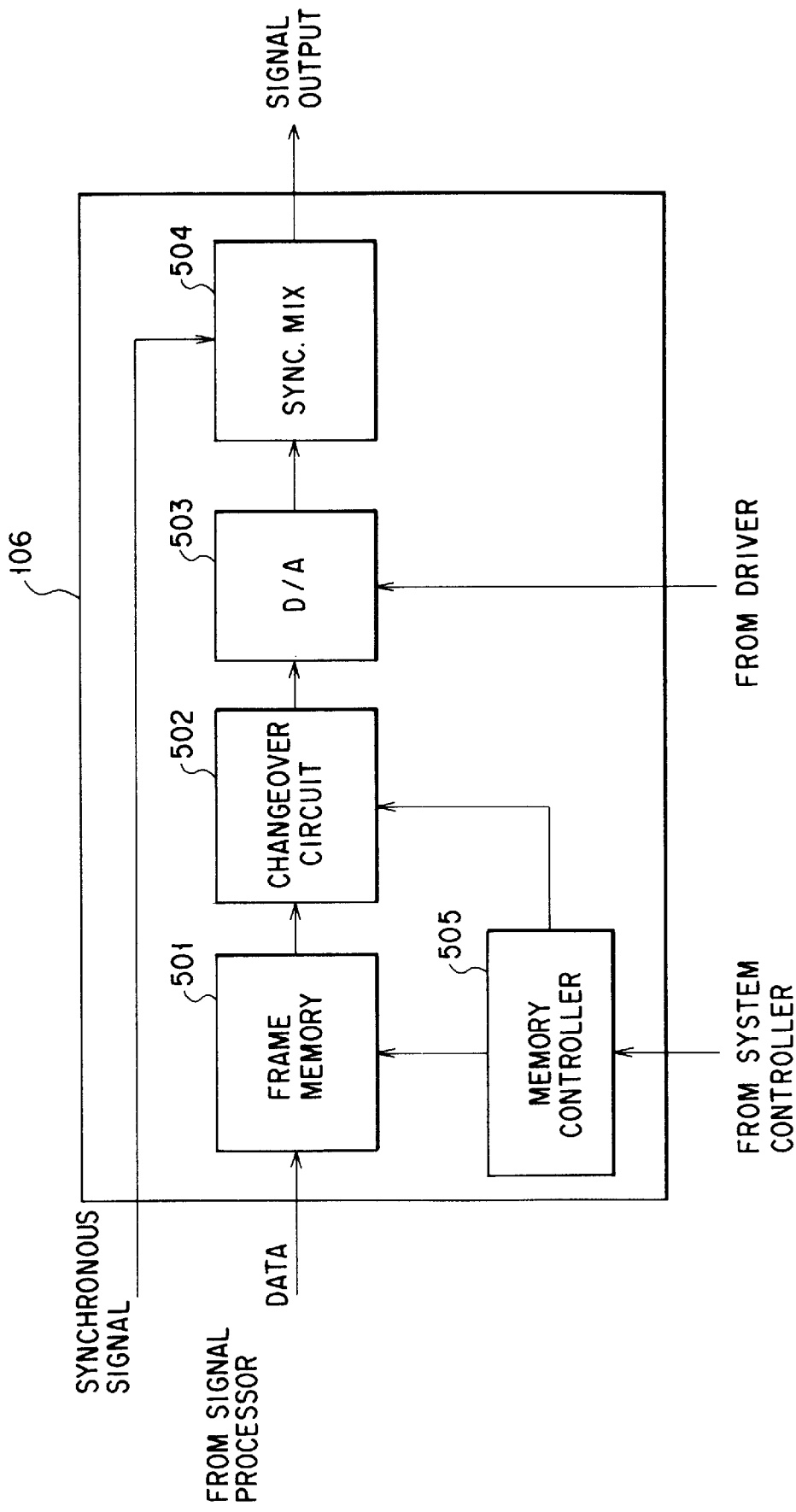
FIG. 11 is a block diagram to show the internal constitution of the display signal processor shown in FIG. 7.

FIG. 11 is a block diagram showing the internal constitution of the display signal processor 106 in FIG. 7. The frame memory 501 temporarily memorizes the data sent from the signal processor 104 sequentially in the frame unit under control of the memory controller 505 to be described later. The data memorized in the frame memory 501, when read out, is to be sent to the changeover circuit 502. The changeover circuit 502 also is controlled by the memory controller 505, and can make changeover between the case of transferring the data from the frame memory 501 direct to D/A 503 and the case of transferring a certain amount to D/A 503 for the purpose of muting processing such as for specific coloring. The data sent from the changeover circuit 502 is subjected to analog conversion according to the pulse signal from the driver 109. The sync-mixing circuit 504 synchronously mixes the analog signal from the D/A converter 503 and the synchronous signal from the signal processor 104 and outputs the mixed signal. At this stage, the synchronous signal is a signal sent from the driver 109 through the signal processor 104, and takes the timing at the head of the data with respect to each of the horizontal scanning direction and the vertical scanning direction.

The memory controller 505 controls the operation of writing or reading out of the data in the frame memory in accordance with the command from the system controller 108, or controls the changeover operation in the changeover circuit 502. For example, in case of a command to freeze the data from the system controller 108, the memory controller 505 prohibits the writing of data to the frame memory 501. Also, in case of a command of muting from the system controller 108, the memory controller 505 sends an instruction to the changeover circuit 502 to change over to the condition of mute processing.

Figure 12:
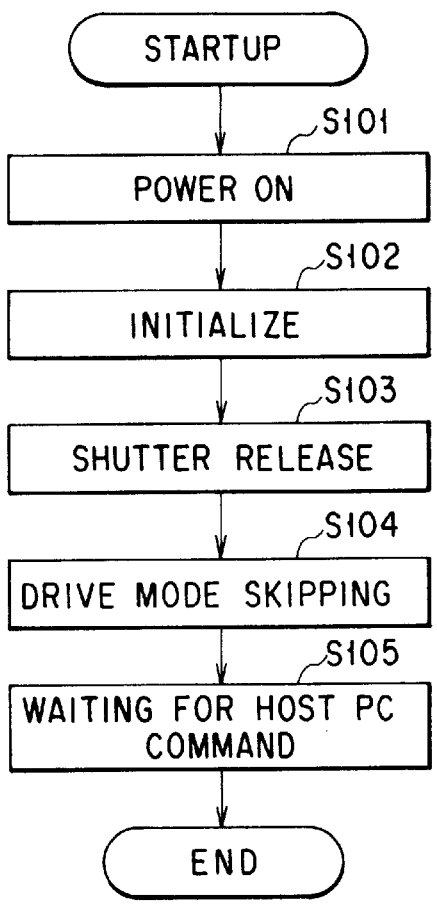
FIG. 12 is a flow chart to show the image pickup apparatus according to the third embodiment of the present invention.
Figure 13:
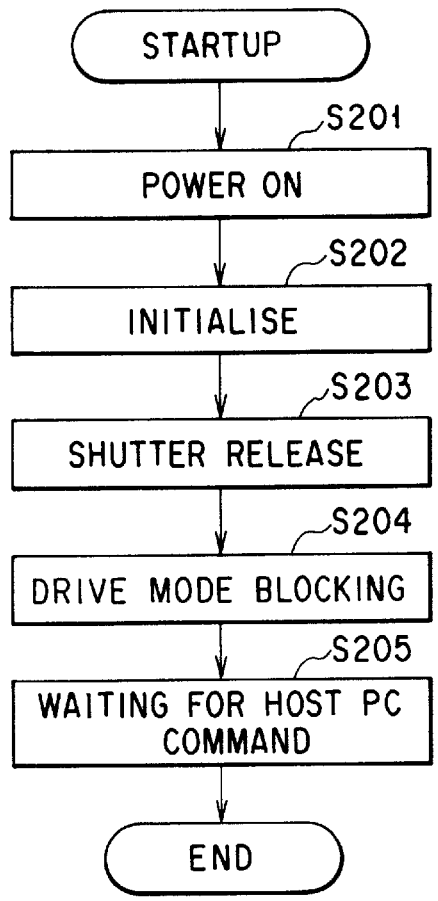
FIG. 13 is a flow chart to show a modification example of the operation shown in FIG. 12.

Next, referring to the flow charts of FIGS. 12 and 13, the operation of the image pickup apparatus according to the third embodiment is explained. In the following explanation, the processing procedures of the system controller 108 are mainly dealt with.

In this third embodiment, there is provided a processing to dissolve such inconvenience that the disturbance of the image at the time of the start of image pickup by the power on operation and the like gives unnatural feeling to the user.

In FIG. 12, firstly, a command for starting up the image pickup apparatus is sent from the host computer 107 to the system controller 108. The system controller 108 responds to the command to input the power (step S101). By this operation, initialization in the system is performed (step S102).

On completion of the initialization, the system controller 108 causes the shutter 102 to be in "open" condition (step S103). The open condition made here is in order to make the driving mode "skip" hereafter, i.e., in order to make it possible to obtain a high field rate motion picture output.

Next, the system controller 108 commands the driver 109 to make the driving mode "skip" (step S104). The command in this case includes the designation of thinning rate and the like. By this step, the driver 109 drives the CMD image pickup device 103 by the skip scanning driving signal (timing pulse).

After this operation, the system controller 108 is in a state to wait for the command from the host computer 107 (step S105).

According to the above processing procedures, at the start of the present apparatus by the operation such as the input of power, firstly the apparatus is driven in the driving mode of "skip". Accordingly, as the motion picture output is obtained in the display apparatus at the start of the present apparatus, the user can carry out the framing work without any special operation. Next, an example with modification of a part of the above processing procedures is shown below.

In FIG. 13, firstly a command to start up the image pickup apparatus is sent from the host computer 107 to the system controller 108. The system controller 108 responds to the command to put the power ON (step S201). By this operation, initialization in the system is performed (step S202).

On completion of the initialization, the system controller 108 causes the shutter 102 to be in "open" condition (step S203). The open condition made here is in order to make the driving mode "block" hereafter, i.e., in order to make it possible to obtain a high field rate motion picture output.

The steps up to this stage are the same as those of the foregoing processing procedures.

Next, the system controller 108 commands the driver 109 to make the driving mode "block" (step S204). The command in this case includes the designation of the position and the size of the block to be displayed and the like. By this step, the driver 109 drives the CMD image pickup device 103 by the block scanning driving signal (timing pulse).

After this operation, the system controller 108 is in a state to wait for the command from the host computer 107 (step S205).

According to the above processing procedures, at the start of the present apparatus by the operation such as the input of power, firstly the apparatus is driven in the "block" driving mode. Accordingly, as the motion picture output is obtained in the display apparatus at the start of the present apparatus, the user can carry out the framing work without any special operation.

Next, the fourth embodiment is explained.

The constitution of the image pickup apparatus of the fourth embodiment is the same as that referred to in the third embodiment as shown in FIG. 7. Also, the same thing applies to the constitutions of the CMD image pickup device and the driver shown in FIGS. 8–11. Accordingly, in this embodiment, the explanation on the constitution is omitted.

The point of difference of the fourth embodiment from the foregoing embodiments is in the processing procedures of the system controller 108. In this fourth embodiment, there is provided a processing to dissolve such inconvenience that when the monitoring is discontinued the same driving condition as that maintained before cannot be easily reproduced.

Hereinafter, referring to the flow charts of FIGS. 14 and 15, the operation of the image pickup apparatus according to the fourth embodiment is explained.

Figure 14:
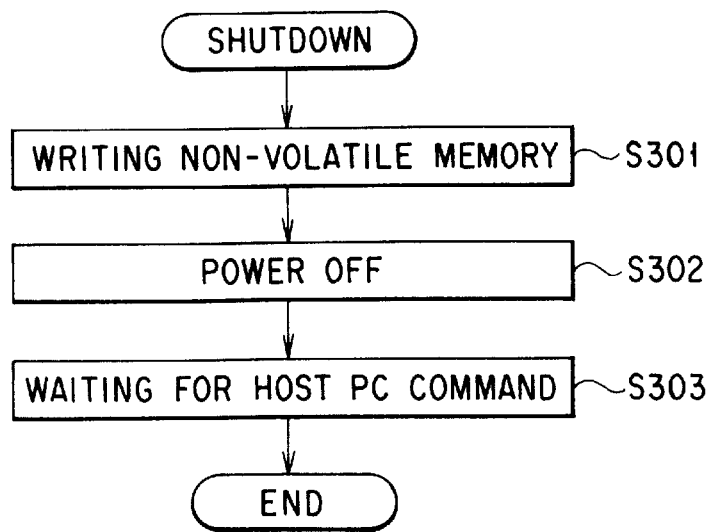
FIG. 14 is a flow chart to show the shut-down process in the image pickup apparatus according to the fourth embodiment of the present invention.

In FIG. 14, firstly, a command for shutdown of the image pickup apparatus is sent from the host computer 107 to the system controller 108. On receipt of this command, the system controller 108 writes, before turning off the power, the data to show the current driving mode and the information related thereto in the non-volatile memory 110 (step S301). The related information means, for example, in case of the driving mode being "skip", the information on thinning rate or the like, and in case of the driving mode being "block", the information on the position and size of the block, and the like. On completion of the writing of the information in the non-volatile memory 110, the system controller 108 turns OFF the power (step S302).

Thereafter, the system controller 108 is in a state to wait for the command from the host computer 107 (step S303).

According to the above processing procedures, even after turning off the power, the information to show the condition of last driving is to be stored in the non-volatile memory 110. Such a processing procedure is adopted to make it possible to reproduce, at the start-up, the driving condition immediately preceding the shutdown. Next, the processing procedure at the start-up is explained.

In FIG. 15, firstly a command to start up the image pickup apparatus is sent from the host computer 107 to the system controller 108. The system controller 108 responds to the command to put the power ON (step S401). By this operation, initialization in the system is performed (step S402).

On completion of the initialization, the system controller 108 reads out from the non-volatile memory 110 the information memorized at the time of the shutdown (step S403). Based on the information thus read out, the system controller 108 identifies the condition of the driving mode at the time of the shutdown (step S404).

If the driving mode at the time of the shutdown is "block", in order to make it possible to carry out driving by block scanning, the system controller 108 causes to make the shutter 102 "open" condition (step S405). Next, the system controller 108 commands the driver 109 to make the driving mode "block" (step S406). The command in this case includes the designations of the position and size of the block to be displayed, and the like. By this procedure, the CMD image pickup device 103 is to be driven by the driver 109 in the "block" driving mode. Thereafter, the system controller 108 is in a state to wait for the command from the host computer 107 (step S407).

On the other hand, if the driving mode at the time of the shutdown is "skip", in order to make it possible to carry out driving by skip scanning, the system controller 108 causes to make the shutter 102 "open" condition (step S408). Next, the system controller 108 commands the driver 109 to make the driving mode "skip" (step S409). The command in this case includes the designations of the thinning rate, and the like. By this procedure, the CMD image pickup device 103 is to be driven by the driver 109 in the "skip" driving mode. Thereafter, the system controller 108 is in a state to wait for the command from the host computer 107 (step S407).

On the other hand, if the driving mode at the time of the shutdown is "whole pixels", in order to make it possible to carry out driving by the whole pixel scanning, the system controller 108 causes to make the shutter 102 "shut" condition (initial state) once (step S410). Next, the system controller 108 commands the driver 109 to make the driving mode "whole pixels" (step S411). By this procedure, the CMD image pickup device 103 is to be driven by the driver 109 in the "whole pixel" driving mode. Next, the recording operation for forming the still picture is to be made (step S412). Thereafter, the system controller 108 is in a state to wait for the command from the host computer 107 (step S407).

According to the above processing procedure, at the time of the starting up, the driving condition immediately preceding the shutdown is to be reproduced. For this reason, even after the temporary discontinuance of the monitoring work by the user, the desired monitoring work can be directly resumed, thus promising the improved work efficiency and convenience of use. Further, the user is free from the anxiety that, in case of an unexpected shutdown of the image pickup apparatus, the images which were being monitored disappear and can no longer be reproduced.

In case that the line which had not been scanned before the changeover of the driving mode starts to be scanned, since no reset operation was made on the related line during the non-scanned period, normal output is not obtainable during the initial one frame period. An improvement of this point is provided by the fifth embodiment.

The constitution of the image pickup apparatus of the fifth embodiment is the same as that referred to in the third embodiment as shown in FIG. 7. Also, the same thing applies to the constitutions of the CMD image pickup device and the driver shown in FIGS. 8–11. Accordingly, in this embodiment, the explanation on the constitution is omitted.

The point of difference of the fifth embodiment from the foregoing embodiments is in the processing procedures of the system controller 108. In this fifth embodiment, there is provided a processing to dissolve such inconvenience that the disturbance of the image generated at the time of changing over the driving mode gives the user a feeling of discrepancy.

Hereinafter, referring to the flow charts of FIGS. 16 to 21, the operation of the image pickup apparatus according to the fifth embodiment is explained.

In FIG. 16, firstly, a command to change over the present driving condition to the whole pixel scanning is sent from the host computer 107 to the system controller 108. In compliance with this command, the system controller 108 commands to the display signal processor 106 first to carry out a freeze processing before executing the changeover to the whole pixel scanning. The memory controller 505 inside the display signal processor 106 complies with the command to prohibit writing of the data in the frame memory 501. By this operation, the frozen state of the data is maintained (step S501).

In this condition, in order to make it possible to carry out driving by the whole pixel scanning, the system controller 108 causes to make the shutter 102 "shut" condition (initial state) once (step S502). Next, the system controller 108 commands the driver 109 to make the driving mode "whole pixels" (step S503). By this procedure, the CMD image pickup device 103 is to be driven by the driver 109 in the "block" driving mode.

At the time of the changeover of the driving mode, the images are disturbed. Therefore, the system controller 108 does not immediately undertake the recording operation but waits until the images are stabilized (step S504). After the waiting, it becomes ready to carry out the recording operation for producing a still picture (step S505). Thereafter, the system controller 108 is in a condition to wait for the command from the host computer 107 (step S506).

According to the above processing procedure, a freezing processing is provided at the time of carrying out the changeover of the driving mode. For this reason, no image disturbance occurs at the time of the changeover of the driving mode, and the monitoring user has no feeling of disagreement. Next, an example with modification of a part of the above processing procedure is shown below.

In FIG. 17, firstly, a command to change over the present driving condition to the block scanning is sent from the host computer 107 to the system controller 108. In compliance with this command, the system controller 108 commands to the display signal processor 106 first to carry out a freeze processing before executing the changeover to the block scanning. The memory controller 505 inside the display signal processor 106 complies with the command to prohibit writing of the data in the frame memory 501. By this operation, the frozen state of the data is maintained (step S601).

In this condition, in order to make it possible to carry out driving by the block scanning, the system controller 108 causes to make the shutter 102 "open" condition (step S602). Next, the system controller 108 commands the driver 109 to make the driving mode "block" (step S603). By this procedure, the CMD image pickup device 103 is to be driven by the driver 109 in the "block" driving mode.

At the time of the changeover of the driving mode, the images are disturbed. Therefore, the system controller 108 waits only for the period of about one frame portion until the images are stabilized (step S604). After the waiting is over, the frozen state is released (step S605). Thereafter, the system controller 108 is in a condition to wait for the command from the host computer 107 (step S606).

According to the above processing procedure, there is obtained the same effect as in the above-stated case of the changeover to the whole pixel scanning. Next, there is shown below another example in which a part of the above processing procedures is modified.

Figure 18:
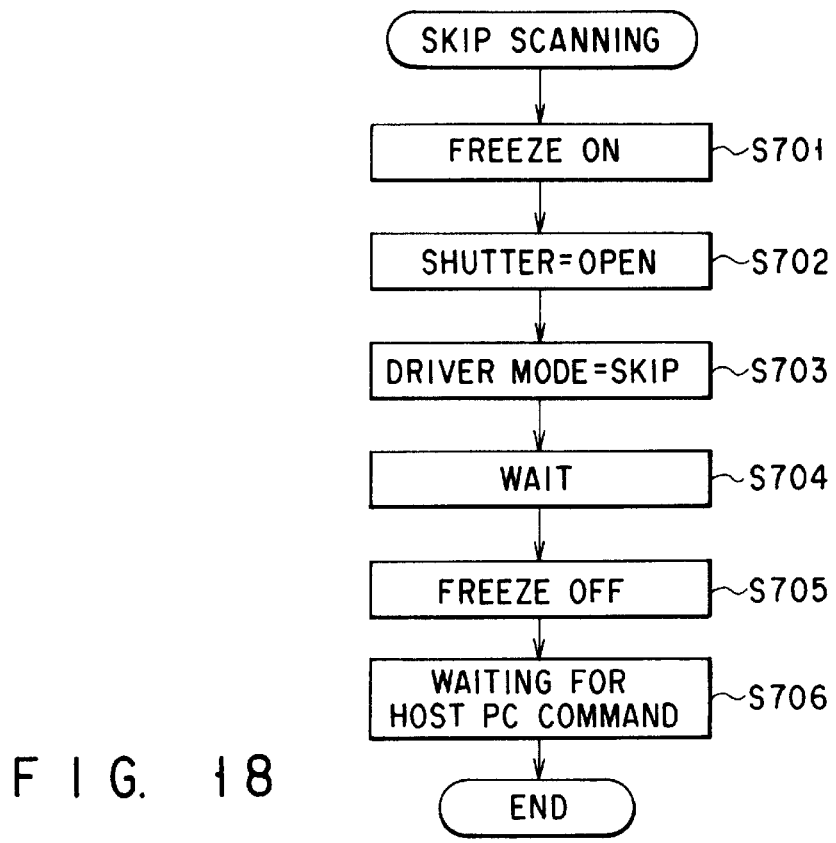
FIG. 18 is a flow chart to show the skip scanning process of the image pickup apparatus according to the fifth embodiment of the present invention.

In FIG. 18, firstly, a command is sent from the host computer 107 to the system controller 108 to change over the present driving condition to the skip scanning. In compliance with this command, the system controller 108 commands to the display signal processor 106 first to carry out a freeze processing before executing the changeover to the skip scanning. The memory controller 505 inside the display signal processor 106 complies with this command and prohibits writing of the data in the frame memory 501. By this operation, the frozen state of the data is maintained (step S701).

In this condition, in order to make it possible to carry out driving by the skip scanning, the system controller 108 causes to make the shutter 102 "open" condition (step S702). Next, the system controller 108 commands the driver 109 to make the driving mode "skip" (step S703). By this procedure, the CMD image pickup device 103 is to be driven by the driver 109 in the "skip" driving mode.

At the time of the changeover of the driving mode, the images are disturbed. Therefore, the system controller 108 waits only for a period of about one frame portion until the images are stabilized (step S704). After the waiting is over, the frozen state is released (step S705). Thereafter, the system controller 108 is in a condition to wait for the command from the host computer 107 (step S706).

According to the above processing procedure, there are obtained the same effect as in the case of the changeover to the above whole pixel scanning and the block scanning.

Up to this paragraph the explanation has been given on the cases of the freezing processing provided at the time of the changeover of the driving mode. However, as explained hereinafter, constitution may be made to provide a muting processing instead.

Figure 19:
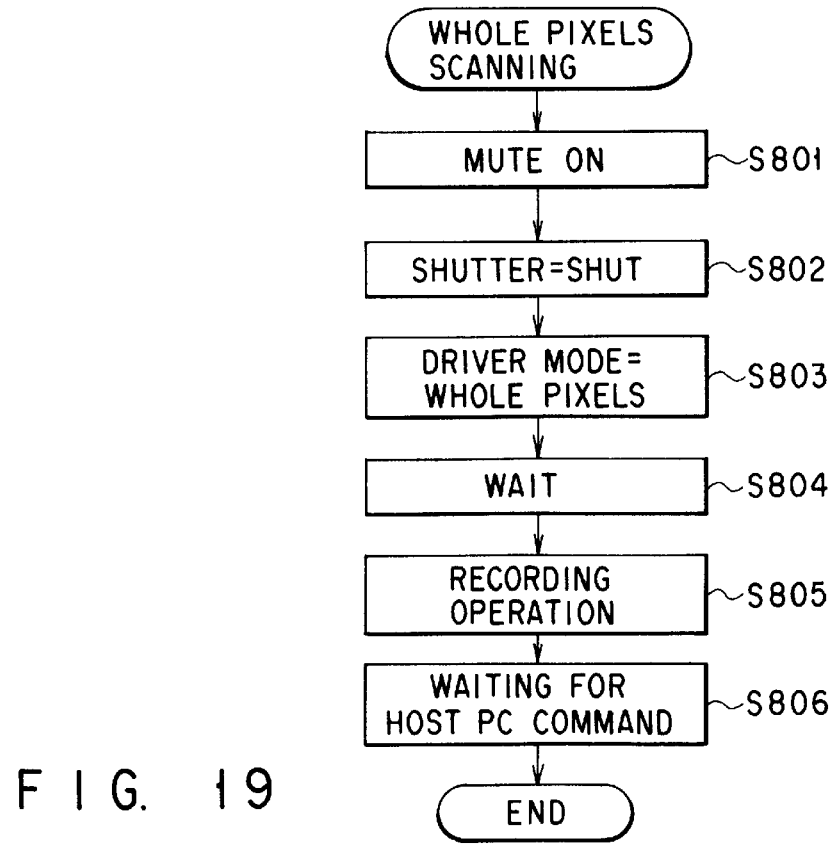
FIG. 19 is a flow chart to show a modified example of the operation shown in FIG. 16.

In FIG. 19, firstly, a command is sent from the host computer 107 to the system controller 108 to change over the present driving condition to the whole pixel scanning. In compliance with this command, the system controller 108 commands to the display signal processor 106 first to carry out a muting processing before executing the changeover to the whole pixel scanning. The memory controller 505 inside the display signal processor 106 complies with this command and commands the changeover circuit 502 to changeover to the mute processing condition. By this operation, the changeover circuit 502 processes the data sent in for muting, by which the muted condition is maintained (step S801).

Since the processing's of the steps S802 to S806 are the same as those of the steps S502 to S506 given in FIG. 16, the explanation thereon is omitted.

According to the above processing procedure, a muting processing is provided at the time of carrying out the changeover of the driving mode. For this reason, no image disturbance occurs at the time of the changeover of the driving mode, and the monitoring user has no feeling of disagreement. Next, an example with modification of a part of the above processing procedure is shown below.

Figure 20:
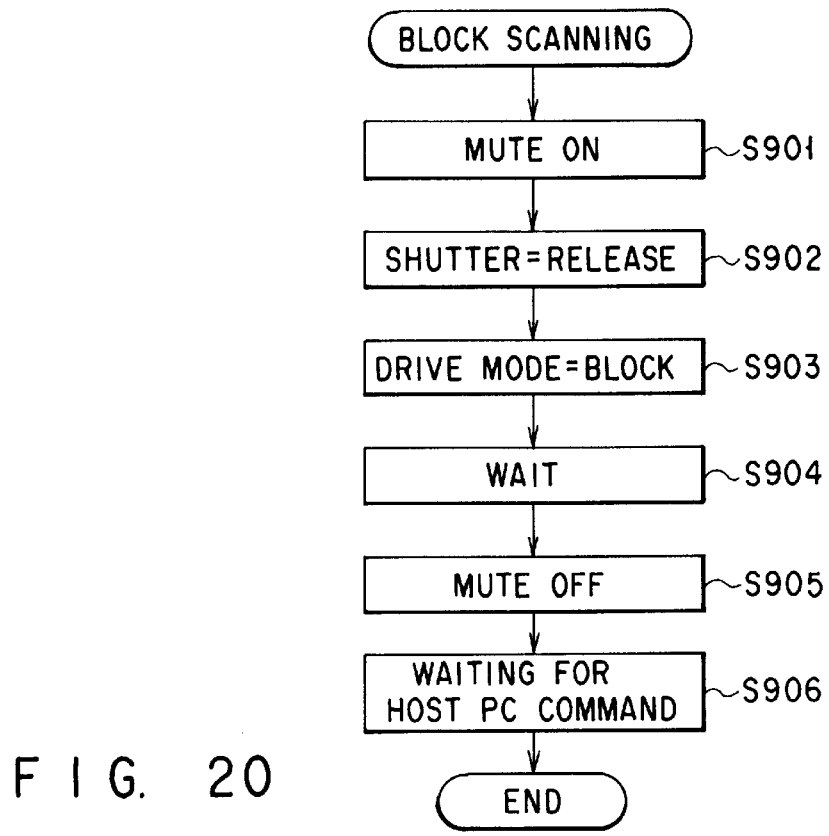
FIG. 20 is a flow chart to show a modified example of the operation shown in FIG. 17.

In FIG. 20, firstly, a command to change over the present driving condition to the block scanning is sent from the host computer 107 to the system controller 108. In compliance with this command, the system controller 108 commands to the display signal processor 106 first to carry out a mute processing before executing the changeover to the block scanning. The memory controller 505 inside the display signal processor 106 complies with this command and commands the changeover circuit 502 to changeover to the mute processing condition. By this operation, the changeover circuit 502 processes the data sent in for muting, by which the muted condition is maintained (step S901).

Since the processing's of the steps S902 to S906 are the same as those of the steps S602 to S606 given in FIG. 17, the explanation thereon is omitted.

According to the above processing procedure, there is obtained the same effect as in the above-stated case of the changeover to the whole pixel scanning. Next, there is shown below another example in which a part of the above processing procedures is modified.

Figure 21:
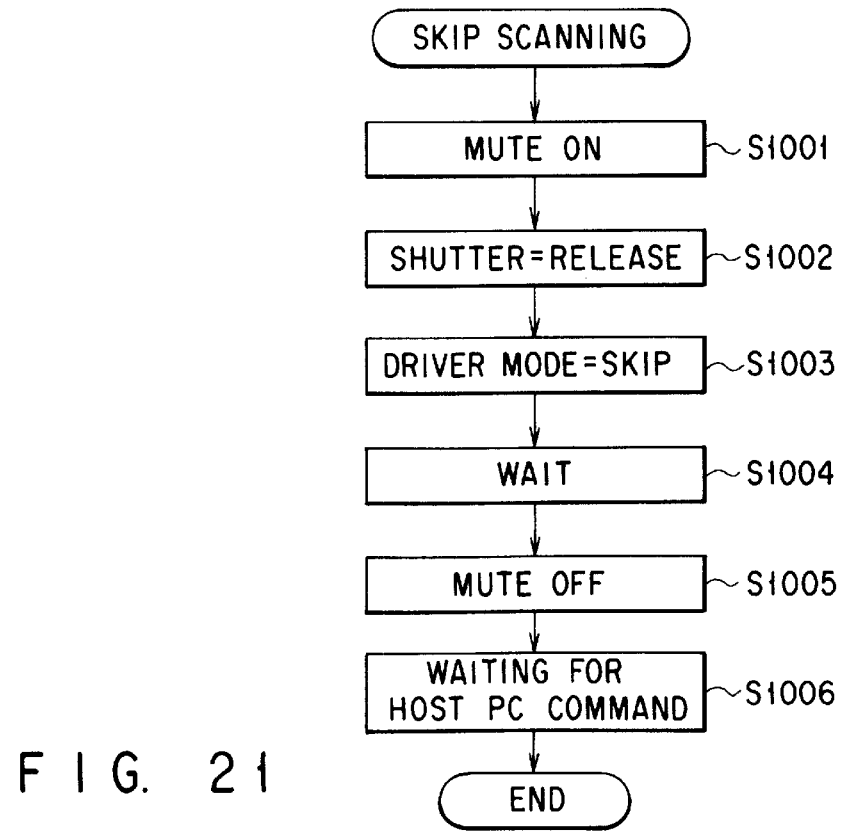
FIG. 21 is a flow chart to show a modified example of the operation shown in FIG. 18.

In FIG. 21, firstly, a command is sent from the host computer 107 to the system controller 108 to change over the present driving condition to the skip scanning. In compliance with this command, the system controller 108 commands to the display signal processor 106 first to carry out a mute processing before executing the changeover to the skip scanning. The memory controller 505 inside the display signal processor 106 complies with this command and commands the changeover circuit 502 to changeover to the mute processing condition. By this operation, the changeover circuit 502 processes the data sent in for muting, by which the muted condition is maintained (step S1001).

Since the processing's of the steps S1002 to S1006 are the same as those of the steps S702 to S706 given in FIG. 18, the explanation thereon is omitted.

According to the above processing procedure, there is obtained the same effect as in the above-stated case of the changeover to the whole pixel scanning or block scanning.

Hereinafter, the sixth embodiment of the present invention is explained.

The constitution of the image pickup apparatus of the sixth embodiment is the same as that referred to in the third embodiment as shown in FIG. 7. Also, the same thing applies to the constitutions of the CMD image pickup device and the driver shown in FIGS. 8–11. Accordingly, in this embodiment, the explanation on the constitution is omitted.

The point of difference of the sixth embodiment from the foregoing embodiments is in the processing procedures of the system controller 108. In this sixth embodiment, there is provided a processing to dissolve the inconvenience of use resulting from the difference of image angles at the time of taking in the still image by changing over the driving mode from the block scanning to the whole pixel scanning.

Hereinafter, referring to the flow chart of FIG. 22, the operation of the image pickup apparatus according to the sixth embodiment is explained.

Figure 22:
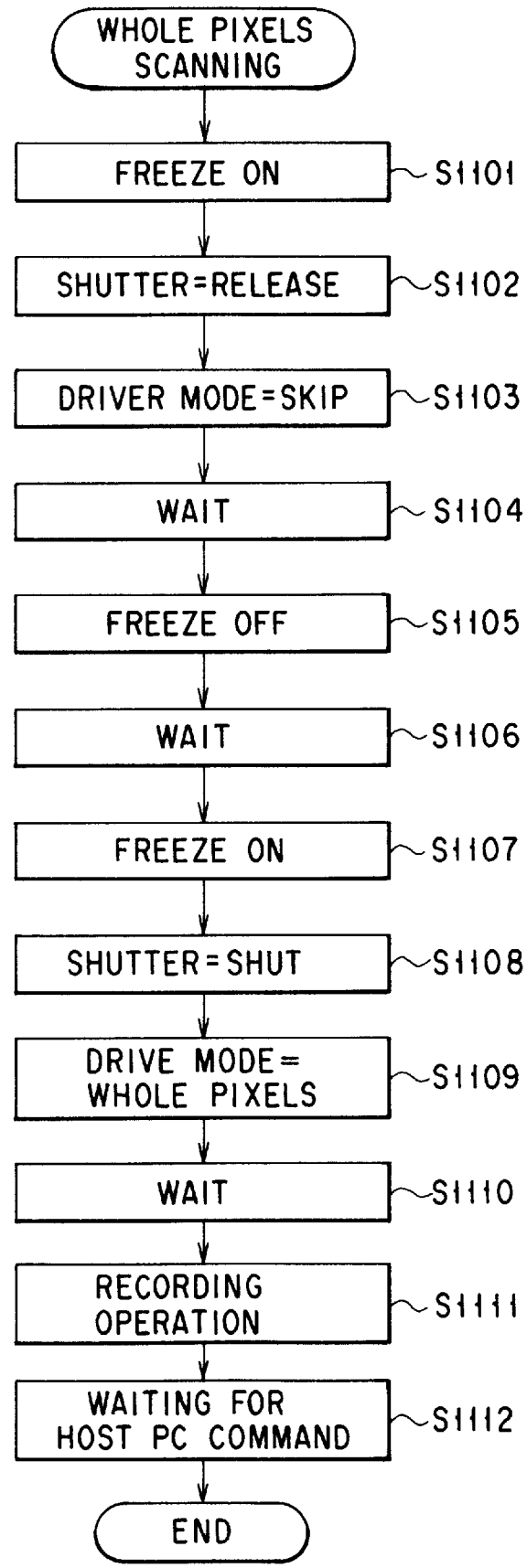
FIG. 22 is a flow chart to show the process of the whole pixel scanning of the image pickup apparatus according to the sixth embodiment of the present invention.

In FIG. 22, firstly, a command is sent from the host computer 107 to the system controller 108 to change over the present driving condition of block scanning to the whole pixel scanning. In compliance with this command, the system controller 108 undertakes to changeover to the skip scanning processing before executing the changeover to the whole pixel scanning. For this purpose, the system controller 108 commands to the display signal processor 106 first to carry out a freeze processing before executing the changeover to the skip scanning. The memory controller 505 inside the display signal processor 106 complies with the command to prohibit writing of the data in the frame memory 501. By this operation, the frozen state of the data is maintained (step S1101).

In this condition, in order to make it possible to carry out driving by the skip scanning, the system controller 108 causes to make the shutter 102 "open" condition (step S1102). Next, the system controller 108 commands the driver 109 to make the driving mode "skip" (step S1103). By this procedure, the CMD image pickup device 103 is to be driven by the driver 109 in the "skip" driving mode.

At the time of the changeover of the driving mode, the images are disturbed. Therefore, the system controller 108 waits for a duration of one frame portion until the images are stabilized (step S1104). After the waiting, the frozen state is released (step S1105), and thus the driving by the skip scanning is carried out.

And, the system controller 108 waits for a period of about one frame portion until the frame memory 501 completes writing in of the data based on the skip scanning (step S1106). After the waiting, the system controller 108 starts to the changeover processing to the whole pixel scanning.

The system controller 108 commands to the display signal processor 106 first to carry out a freeze processing before executing the changeover to the full pixel scanning. The memory controller 505 inside the display signal processor 106 complies with this command and prohibits writing of the data in the frame memory 501. By this operation, the frozen state of the data is maintained (step S1107).

In this condition, in order to make it possible to carry out driving by the whole pixel scanning, the system controller 108 causes to make the shutter 102 "shut" condition (initial state) once (step S1108). Next, the system controller 108 commands the driver 109 to make the driving mode "whole pixels" (step S1109). By this procedure, the CMD image pickup device 103 is to be driven by the driver 109 in the "whole pixel scanning" driving mode.

At the time of the changeover of the driving mode, the images are disturbed. Therefore, the system controller 108 does not immediately undertake the recording operation but waits until the images are stabilized (step S1110). After the waiting is over, the state becomes ready to make recording operation for forming a still image (step S1111). Thereafter, the system controller 108 is in a condition to wait for the command from the host computer 107 (step S1112).

According to the above processing procedure, in case of transferring the driving condition in the block scanning to the whole pixel scanning, the mode is first changed over to the skip scanning which has the same picture angle as the angle at the time of the whole pixel scanning and then changed over to the whole pixel scanning. Therefore, it is possible to monitor more accurately the object to be taken in as a still picture.

In this sixth embodiment, the explanation has been given on the cases of the freezing processing provided at the time of the changeover of the driving mode. However, constitution may be made to provide a muting processing instead.

In the block scanning, immediately after the change of the position or size of the said block, when the line which had not been scanned before comes to be scanned, because the said line was not subjected to a reset operation during the non-scanned period, normal output is not obtainable during the initial one frame period. To improve this period is the seventh embodiment.

The constitution of the image pickup apparatus according to the seventh embodiment is the same as that referred to in the third embodiment as shown in FIG. 7. Also, the same thing applies to the constitutions of the CMD image pickup device and the driver shown in FIGS. 8–11. Accordingly, in this embodiment, the explanation on the constitution is omitted.

The point of difference of the seventh embodiment from the foregoing embodiments is in the processing procedures of the system controller 108. In this seventh embodiment, there is provided a processing to dissolve the inconvenience of use given to the user resulting from the disturbance of images at the time of changing the position and size of the block on the screen in the block scanning.

Hereinafter, referring to the flow chart of FIG. 23, the operation of the image pickup apparatus according to the seventh embodiment is explained.

In FIG. 23, firstly, a command is sent from the host computer 107 to the system controller 108 to change over the position on the screen of the block which is set at present to other position. In compliance with this command, the system controller 108 first commands to the display signal processor 106 to carry out freezing processing before executing the changeover to the predetermined position. The memory controller 505 inside the display signal processor 106 complies with this command and prohibits the writing of the data in the frame memory 501. By this operation, the frozen state of the data is maintained (step S1201).

In this condition, for the purpose of the driving by the block scanning, the system controller 108 causes to make the shutter 102 "open" condition (step S1202). Next, the system controller 108 commands the driver 109 to make the driving mode "block" (step S1203). By this procedure, the CMD image pickup device 103 is to be driven by the driver 109 in the "block" driving mode.

And, the system controller 108 commands the driver 109 to change the presently set position of the block on the screen to the predetermined position (step S1204). In this case, the command is executed by carrying out, for example, an address designation. By this procedure, the said block is to be shifted to the position designated by the command.

At the time of the change of the block position, the images are disturbed. Therefore, the system controller 108 waits for a period of about one frame portion until the images are stabilized (step S1205). After the waiting is over, the frozen state is released (step S1206). Thereafter, the system controller 108 is in a condition to wait for the command from the host computer 107 (step S1207).

According to the above processing procedure, freezing processing is provided in the case of carrying out the change of position of the block. No disturbance of image occurs at the time of the change of position of the block, and the monitoring user has no disagreeable feeling.

In this seventh embodiment, the explanation has been given on the case of the freezing processing provided at the time of the change of the block position. However, constitution may be made to provide a muting processing instead. Also, whereas, in this seventh embodiment, the explanation has been made on the case of changing the position of the block, constitution may be made to change the other parameters such as the size of the block.

In the skip scanning, immediately after the change of the thinning rate of said skip, when the line which had not been scanned before starts to be scanned, because the said line was not subjected to a reset operation during the non-scanned period, normal output is not obtainable during the initial one frame period. To improve this period is the eighth embodiment.

The constitution of the image pickup apparatus according to the eighth embodiment is the same as that referred to in the first embodiment as shown in FIG. 7. Also, the same thing applies to the constitutions of the CMD image pickup device and the driver shown in FIGS. 8–11. Accordingly, in this embodiment, the explanation on the constitution is omitted.

The point of difference of the eighth embodiment from the preceding embodiments is in the processing procedures of the system controller 108. In this eighth embodiment, there is provided a processing to dissolve the inconvenience of use given to the user resulting from the disturbance of images at the time of changing the thinning rate of the pixels in the screen in the skip scanning.

Hereinafter, referring to the flow chart of FIG. 24, the operation of the image pickup apparatus according to the eighth embodiment is explained.

In FIG. 24, firstly, a command is sent from the host computer 107 to the system controller 108 to change over the position on the screen of the block which is set at present to other position. For example, there is issued a command to change the thinning rate of the pixels from the four thinning (to take in only one pixel out of the four pixels) to the two thinning. In compliance with this command, the system controller 108 first commands to the display signal processor 106 to carry out freezing processing before executing the changeover to the predetermined thinning rate. The memory controller 505 inside the display signal processor 106 complies with this command and prohibits the writing of the data in the frame memory 501. By this operation, the frozen state of the data is maintained (step S1301).

In this condition, for the purpose of the driving by the skip scanning, the system controller 108 causes to make the shutter 102 "open" condition (step S1302). Next, the system controller 108 commands the driver 109 to make the driving mode "skip" (step S1303). By this procedure, the CMD image pickup device 103 is driven by the driver 109 in the "skip" driving mode.

And, the system controller 108 commands the driver 109 to change the presently set thinning rate to the predetermined thinning rate (step S1304). By this procedure, setting is made to the thinning rate designated by the command.

At the time of the change of the thinning rate, the images are disturbed. Therefore, the system controller 108 waits for a period of about one frame portion until the images are stabilized (step S1305). After the waiting is over, the frozen state is released (step S1306). Thereafter, the system controller 108 is in a condition to wait for the command from the host computer 107 (step S1307).

According to the above processing procedure, freezing processing is provided in the case of carrying out the change of the thinning rate. No disturbance of image occurs at the time of the change of the thinning rate, and the monitoring user has no disagreeable feeling.

In this eighth embodiment, the explanation has been given on the cases of the freezing processing provided at the time of the changeover of the thinning rate. However, constitution may be made to provide a muting processing instead.

According to the third to the eighth embodiments described above, in monitoring the object with the display apparatus, no feeling of disagreement is given to the user and good convenience of use is provided.

Hereinafter, outlines of the ninth and the tenth embodiments of the present invention are explained.

The color image pickup apparatus according to the ninth embodiment of the present invention is so composed that, in front of the image pickup device comprising a plurality of pixels arranged in matrix form, there are disposed the color filters in which a plurality of colors are coordinated with the respective pixels, and when the electric charge stored on the above plural pixels is read out in coordination with the respective colors of the color filters, the mode selection means selects either to read out by thinning the predetermined number of pixels from the plural pixels (first reading out mode) or to read out without thinning (second reading out mode), and reading out is performed in such manner that the sequence of the colors of the color filters arranged at the front face of the pixels corresponding to the read out signal is the same between the case where the reading out is made with thinning the predetermined number of pixels and the case where the reading out is made without thinning.

In the case where, in the color image pickup apparatus of the ninth embodiment as above, in case that the mode of reading out by thinning has been selected, when the output signal of the above pixels corresponding to the adjacent color filters of the same color is added, it becomes possible to lower substantially the response of opening and prevent the generation of the return strain.

Also, with respect to the arrangement of the color filters, in general the arrangements are repeated on the primary unit of 8 pixels of 2 (horizontal)×4 (vertical). In this case, when a so-called XY address system image pickup device which is capable of reading out the signals of optional pixels is used and the arrangement of the color filters is made to Bayer arrangement or color difference sequential arrangement, the control circuit for selecting only the signals of the same color pixels out of the plural pixels belonging to the primary unit and making addition as above, can be simplified.

The color image pickup apparatus according to the tenth embodiment of the present invention is so composed that, in front of the image pickup device comprising a plurality of pixels arranged in matrix form, there are disposed the primary color filters in which a plurality of colors are coordinated with the respective pixels, and when the electric charge stored on the above plural pixels is read out in coordination with the respective colors of the color filters, there is provided the mode selection means for selecting either to read out by thinning the predetermined number of pixels from the plural pixels or to read out without thinning, and when the mode of reading out is selected, a signal of complementary color is outputted by adding the output signal of the above pixels corresponding to the said nearby color filter of different color, and in case of reading out without thinning, the signal of the primary colors is outputted.

In this case, when a so-called XY address system image pickup device is used and the arrangement of the color filters is made to interline arrangement, the control circuit for adding the output signals of the pixels corresponding to the nearby color filters of the different colors can be simplified.

Also, in the color image pickup apparatus of the ninth or tenth embodiment as above, by reading out the output of the image pickup device without thinning in case of taking a still picture, and reading out the output of the image pickup device in case of taking a motion picture, it is possible to use the image pickup device having many pixels for taking the still images of high resolution, and to provide a color image pickup apparatus which is also usable for taking motion pictures.

Figure 25:
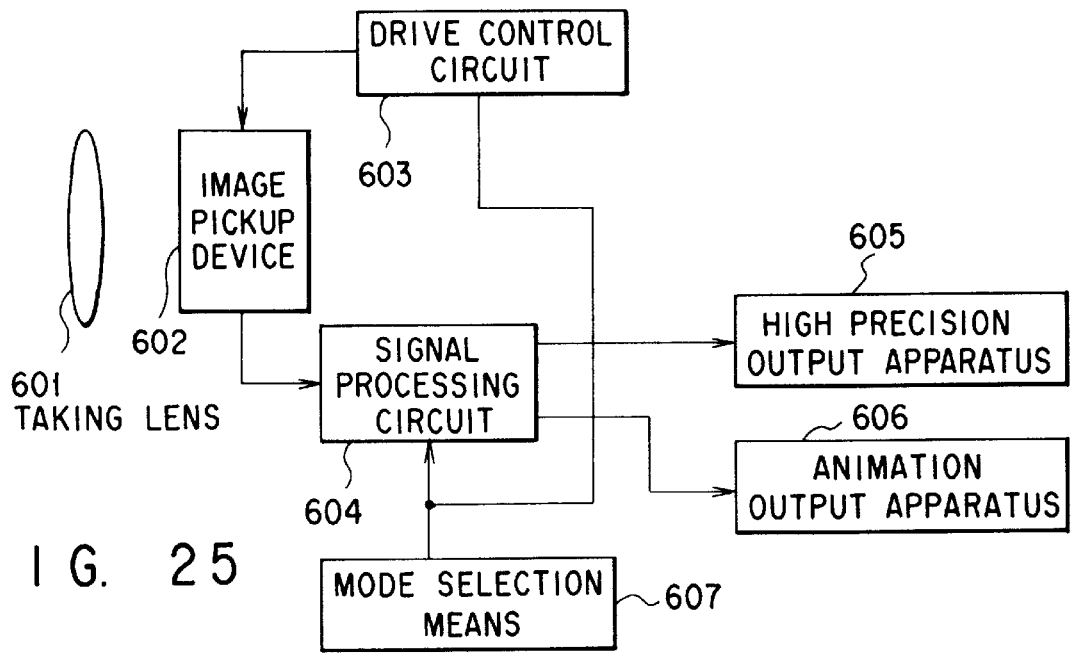
FIG. 25 is a constitution view of the image pickup apparatus according to the ninth and tenth embodiments of the present invention.

FIG. 25 is a view to show the constitution of the color image pickup apparatus relating to the ninth and the tenth embodiments of the present invention. In these ninth and tenth embodiments, the constitution of the image pickup part only is disclosed, but in practice the apparatus is furnished with various circuits having the functions equivalent to those shown in FIG. 7 above such as the signal processor 104, driver 109, and system controller 108, and the like.

In the above figure, rearward the taking lens 601 for focusing the non-illustrated object ray, there is disposed an image pickup device 602 comprising a plurality of pixels arranged in matrix form with arrangement of the non-illustrated color filter in front. The drive control circuit 603 is connected to the above image pickup device 602, and supplies various signals necessary for driving the image pickup device 602. Also, the output of the image pickup device 602 is connected to the signal processing circuit 604 for converting to the desired image signal. The output of the signal processing circuit 604 is connected to the high precision image output apparatus 605 such as high resolution monitor of still image and motion picture output apparatus 606 such as NTSC monitor. The mode selection means 607 is connected to the signal processing circuit 604 and the drive control circuit 603 and carries out the changeover between the still image and the motion picture. Here, when a still image is selected, the output signal of the signal processing circuit 604 is outputted to the high precision image output apparatus 605, and when a motion picture is selected, the output signal of the signal processing circuit 604 is outputted to the motion picture output apparatus 606.

In the color image pickup apparatus constituted as above, in case a still image is selected by the mode selection means 607, the drive control circuit 603 controls the operation of the image pickup device 602 so as to read out the predetermined number of pixels without thinning, and outputs its output signal to the signal processing circuit 604. The signal processing circuit 604 converts the above output signal into the desired image signal and outputs it to the high precision image output apparatus 605 to display the still image.

On the other hand, in case the motion picture is selected by the mode selection means 607, the drive control circuit 603 controls the drive of the image pickup device 602 so as to read out the predetermined number of pixels by thinning and outputs its output signal to the signal processing circuit 604. The signal processing circuit 604 converts the above output signal to the desired image signal and outputs it to the motion picture output apparatus 606 to display the motion picture.

Figure 26:
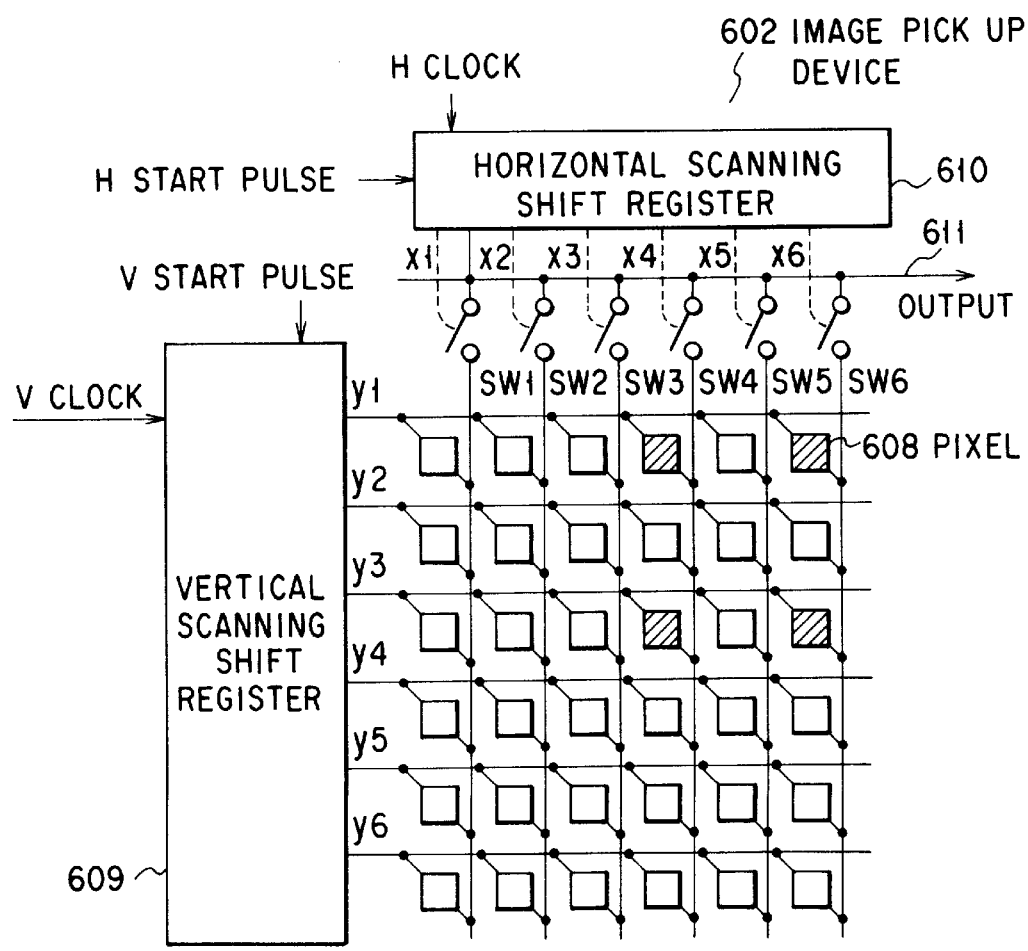
FIG. 26 is a constitution view of the image pickup device according to the ninth and tenth embodiments of the present invention.

FIG. 26 is a view to show the constitution of the above image pickup device 602. The image pickup device 602 includes, besides the CCD which is to read out the signal of the pixels in the predetermined sequence, a so-called XY address system one which can read out the signal by selecting the pixel at an optional position out of the plural pixels. The image pickup device 2 to be used in this embodiment is the XY address system one.

In the above figure, the pixels 608 arranged in matrix form comprise the non-illustrated semiconductor switch and the optical diode connected to one terminal of the said semiconductor switch. In the same line, the respective control terminals of the above semiconductor switches provided on the respective pixels 608 are mutually connected, and are connected to the vertical signal output lines y1, y2, y3, . . . of the vertical scanning shift register 609 on each line. The respective terminals on the other side of the above semiconductor switches provided on the respective pixels on the same row are mutually connected, and are connected to the other terminals of the semiconductor switches sw1, sw2, sw3, . . . which are controlled by the horizontal signal output lines x1, x2, x3, . . . of the horizontal scanning shift register 609 on each row. The other terminals of the above semiconductor switches sw1, sw2, sw3, . . . are connected to the output signal line 611.

In the image pickup device 602 constituted as above, by the line selection signal from the vertical scanning shift register 609, the semiconductor switches provided on the respective pixels 602 of the selected line are turned on, and the signals of the pixels of the related lines are read out to the output lines of the respective rows to which the said pixels are connected. These signals are read out in order from the output signal line 611 through the above semiconductor switches sw1, sw2, sw3, . . . which are driven by the horizontal scanning shift register 610. In this case, it is possible to read out the signals of plural pixels by selecting the plural pixels by either one or both of the vertical scanning shift register 609 and the horizontal scanning shift register 610. For example, when the line 1 and line 3 are selected by the vertical scanning shift register 609 and the row 4 and row 6 are selected by the horizontal scanning shift register 610, the signals of 4 pixels of (4 (row), 1 (line)), (4,3), (6,1), (6,3) are added and read out.

Figures 27A, 27B:
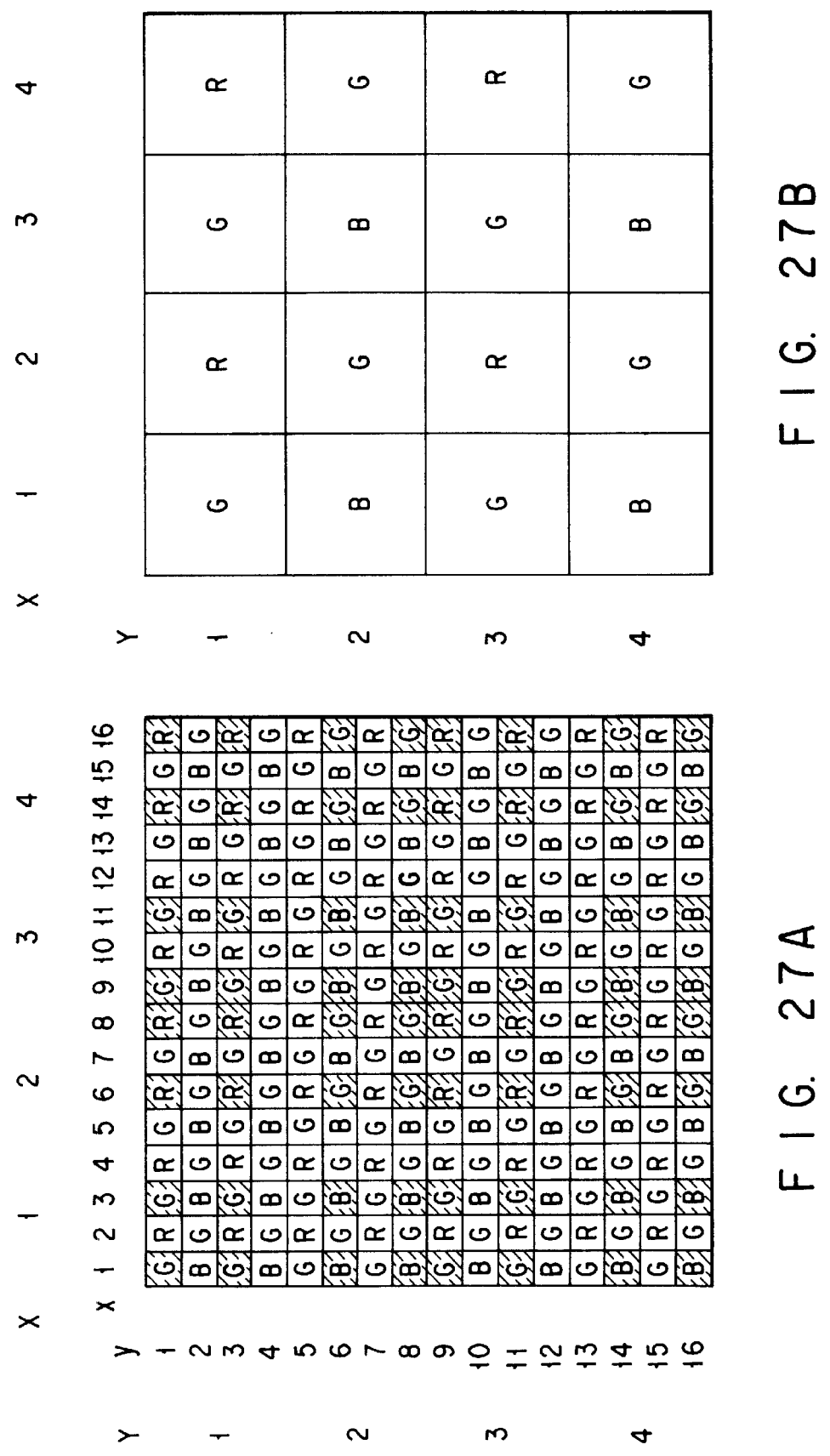

FIGS. 27A and 27B show an example of the color filter of the image pickup device 602 according to the ninth embodiment of the present invention.

The layout of the color filters shown in the same figures is the well known Bayer layout. As shown in said figure, a half of the check pattern of RGB is G, and the rest of the area is equally divided half each into R and B. The output signals of the image pickup device 602 with arrangement of the color filters of the above layout on the front face are thinned to ¼ both horizontally and vertically to make the number of pixels to be read out ¹⁄₁₆. In this case, if the pixels are simply thinned to read out the signals of (x rows, y lines) in the order of (1,1), (5,1) (9,1), (1,5), (5,5), (9,5), . . . ; (1,9), (5,9), (9,9) . . . , then only the signal G is outputted, so that no color image pickup is feasible. Accordingly, footed on the primary unit of 4 pixels in the horizontal direction and 4 pixels in the vertical direction, or 16 pixels in total, the signals of the designated colors are to be read out from said primary unit. The number of the signals to be read out is the same as in the case of simple thinning, and the time required for obtaining the signal of one frame of picture is shortened to ¹⁄₁₆.

Here, the primary unit of Xth in the horizontal direction and Yth in the vertical direction is set to be [X,Y].

In case of reading out the signal of the primary unit of [1,1], the line 1 and the line 3 are simultaneously selected from the output signals of the vertical scanning shift register 609. Under this condition, the line 1 and the line 3 are simultaneously selected by the output signal of the horizontal scanning shift register 610. By this operation, only the image signals corresponding to the color filter of G of (1,1), (3,1), (1,3), (3,3) are read out with addition of four pixels. Next, in order to read out the signal of the primary unit of [2,1], under the condition that the line 1 and line 3 of the output signals of the vertical scanning shift register 609 are simultaneously selected, the row 6 and row 8 are simultaneously selected by the output signal of the horizontal scanning shift register 610. By this procedure, only the signals of the pixels corresponding to the color filters of R of (6,1), (8,1), (6,3), (8,3) are read out with addition of four pixels.

Hereinafter, in the same manner, the output signal of the vertical scanning shift register 609 and the output signal of the horizontal scanning shift register 610 are controlled so that the image signals corresponding to the color filters of G and R are alternately read out with addition of four pixel equivalents.

Next, in case of reading out the signal of the primary unit of [1,2], under the condition that the line 6 and the line 8 are simultaneously selected out of the output signals of the vertical scanning shift register 609, the row 1 and the row 3 are simultaneously selected by the output signal of the horizontal scanning shift register 610. By this operation, only the image signals corresponding to the color filter of B of (1,6), (3,6), (1,8), (3,8) are read out with addition of four pixels. Next, in order to read out the signal of the primary unit of [2,2], under the condition that the line 6 and line 8 of the output signals of the vertical scanning shift register 609 are simultaneously selected, the row 6 and row 8 are simultaneously selected by the output signal of the horizontal scanning shift register 610. By this procedure, only the signals of the pixels corresponding to the color filters of G of (6,6), (8,6), (6,8), (8,8) are read out with addition of four pixels.

Hereinafter, in the same manner, the output signal of the vertical scanning shift register 609 and the output signal of the horizontal scanning shift register 610 are controlled so that the image signals corresponding to the color filters of B and G are alternately read out with addition of four pixel equivalents.

As described above, in case of reading out the signals having the primary unit of the odd number order in the vertical direction, in the same manner as in case of reading out the signals having the primary unit of the first order in the vertical direction, the output signal of the vertical scanning shift register 609 and the output signal of the horizontal scanning shift register 610 are controlled so that G and R are alternately read out with addition of four pixel equivalents. Also, in case of reading out the signals having the primary unit of the even number order in the vertical direction, in the same manner as in case of reading out the signals having the primary unit of the second order in the vertical direction, the output signal of the vertical scanning shift register 609 and the output signal of the horizontal scanning shift register 610 are controlled so that B and G are alternately read out with addition of four pixel equivalents.

The output signal of the image pickup device 602 read out as above becomes equivalent to the output signal of the image pickup device having the color filter layout as illustrated in FIG. 27B. As the layout of the color filters of FIG. 27B becomes homologous with that illustrated in FIG. 27A, it is possible to obtain the color image by using the same signal processing circuit as in the case of reading out the whole pixels.

Also, as the above step is equivalent to the case where the number of pixels has decreased to $\frac{1}{16}$, the time required for obtaining the signal for one frame of picture is shortened to $\frac{1}{16}$. Accordingly, even the camera with which the moving picture taking is impossible because of the time required for reading out signals in case of reading out the whole pixels comes to be usable for taking a motion picture. For example, in case of driving an image pickup device having the number of pixels of 4-million pixels (2000×2000) in 20 MHz, the time required for reading out the whole pixels is: (2000× 2000)/(20×106)=0.2 sec., or 5 frames/sec., with which no motion picture can be taken. However, by thinning the pixels as described above, it becomes possible to record 80 scenes/sec. In practice, the drive frequency may be determined to meet the standards such as NTSC and displayed on the monitor or the like.

In the above embodiment shown in FIG. 27 A and B, out of the primary unit formed of 4 pixels in the horizontal direction and 4 pixels in the vertical direction, or 16 pixels in total, reading out is made with addition of the image signals of 4 pixel portions. However, the number of pixels to be added is not limited to four pixels. However, in case of outputting the images with thinning, the image sampling space is widened, and therefore it is desirable, in order to prevent occurrence of return stress, to add a plurality of pixels as in the above embodiment to lower the response of opening.

Further, by making the layout of the color filters in the embodiment shown in FIG. 27 A and B into Bayer layout, the control of addition of the pixels is more simplified than in the case of the later-described interline layout.

FIGS. 28 A and B show the other example of the color filter of the image pickup device 602 relating to the ninth embodiment of the present invention.

The layout of the color filters shown in FIG. 28A is a well known color difference sequential layout, wherein the color filters of Ye (Yellow), Mg (Magenta), Cy (Cyan), and G (Green) are disposed in equal division, respectively. The output signals of the image pickup device 602 made by disposing the color filters of such layout in front are thinned to ¼ both horizontally and vertically to make the number of pixels to be read out into $\frac{1}{16}$. In this case, when the thinning is simply made to read out the image signals of (x rows, y lines) in the order of (1,1), (5,1), (9,1), . . . ; (1,5), (5,5), (9,5), . . . ; (1,9), (5,9), (9,9), . . . , only the image signals corresponding to the Ye color filter are outputted, so that no color image pickup can be performed. Therefore, with a primary unit of 16 pixels comprising 4 pixels in the horizontal direction and 4 pixels in the vertical direction, the signals of the designated colors are to be read out from the said primary unit. The number of the signals to be read out is the same as that thinned, and the time required for obtaining the signals of 1 frame of picture is shortened to $\frac{1}{16}$.

In case of reading out the signals of the primary unit of [1,1], 3 lines out of the output signals of the vertical scanning shift register 609 are selected. Under this condition, the row 1 and the row 3 are simultaneously selected by the output signals of the horizontal scanning shift register 610. By this procedure, only the signals of the pixels corresponding to the Ye color filters of (1,3), (3,3) are added by two pixels and read out. Next, in order to read out the signals of the primary unit of [2,1], with the 3 lines kept in the selected state out of the output signals of the vertical scanning shift register 609, the row 6 and the row 8 are simultaneously selected by the output signals of the horizontal scanning shift register 610. By this procedure, only the signals of the pixels corresponding to the Cy color filters of (6,3), (8,3) are read out with addition of two pixels.

Hereinafter, similarly, the output signals of the vertical scanning shift register 609 and the output signals of the horizontal scanning shift register 610 are controlled so that the image signals corresponding to the color filters of Ye and Cy are alternately read out with addition of two pixel equivalents.

Next, in case of reading out the signals of the primary unit of [1,2], under the condition that 6 lines out of the output signals of the vertical scanning shift register 609 are selected, the row 1 and the row 3 are simultaneously selected by the output signals of the horizontal scanning shift register 610. By this procedure, only the signals of the pixels corresponding to the Mg color filters of (1,6), (3,6) are added by two pixels and read out. Next, in order to read out the signals of the primary unit of [2,2], with the 6 lines kept in the selected state out of the output signals of the vertical scanning shift register 609, the row 6 and the row 8 are simultaneously selected by the output signals of the horizontal scanning shift register 610. By this procedure, only the image signals corresponding to the G color filters of (6,6), (8,6) are read out with addition of two pixels.

Hereinafter, similarly, the output signals of the vertical scanning shift register 609 and the output signals of the horizontal scanning shift register 610 are controlled so that the image signals corresponding to the color filters of Mg and G are alternately read out with addition of two pixel equivalents.

In the same manner as described above, the output signal of the vertical scanning shift register 609 and the output signal of the horizontal scanning shift register 610 are controlled so that, with respect to the signals having the primary unit of the third order in the vertical direction, in the same manner as in the first order, Ye and Cy are alternately read out with addition of two pixel equivalents, and with respect to the signals having the primary unit of the fourth order in the vertical direction, G and Mg are alternately read out with addition of two pixel equivalents.

As described above, by repeating the reading out of the signals having the primary units of the first to the fourth orders in the vertical direction, the output signals of the read out image pickup device 602 become equivalent to the output signals of the image pickup device which has the color filter layout as shown in FIG. 28B. As the layout of the color filters in FIG. 28B becomes similar to that shown in FIG. 28A, this embodiment has entirely the same effect as in the case of the example of Bayer layout above.

FIGS. 29 A and B show an example of the color filter of the image pickup device 602 relating to the tenth embodiment of the present invention.

The layout of the color filters shown in FIG. 29A is a well known interline layout. In the interline layout, in the case of the scanning system like the NTSC signal which is continuous in the horizontal scanning direction and discontinuous in the vertical scanning direction, the respective pixels which take part in division of the three colors of R, G, and B are disposed so that the optical images and the detected image signals of the three primary colors of R, G and B agree in similarity in the process of being converted from the optical image to the television signal. Accordingly, they have such characteristics that no color displacement occurs between the three primary color image signals.

In case of thinning the output signals of the image pickup device 602 with front arrangement of the color filters disposed as above to ¼ both horizontally and vertically to make the number of pixels to be read out ¹⁄₁₆, in the same manner as described in the embodiment of FIGS. 27 and 28 above, with a primary unit of 16 pixels comprising 4 pixels in the horizontal direction and 4 pixels in the vertical direction, the signals of the designated colors are to be read out from the said primary unit, wherein the number of the signals to be read out is the same as that thinned, and the time required for obtaining the signals of 1 frame of picture is shortened to ¹⁄₁₆.

Here, the primary unit in the Xth order in the horizontal direction and the Yth order in the vertical direction is defined as [X,Y]. In case of reading out the signals of the primary unit of [1,1], the line 1 and the line 3 out of the output signals of the vertical scanning shift register 609 are simultaneously selected. Under this condition, the row 1 and the row 2 are simultaneously selected by the output signals of the horizontal scanning shift register 610. By this procedure, only the image signals corresponding to the color filters of G of (1,1), (1,3) and the image signals corresponding to the color filters of R of (2,1), (2,3) are added by four pixels and read out as the image signals corresponding to the color filters of Ye.

Next, in order to read out the signals of the primary unit of [2,1], with the line 1 and the line 3 selected simultaneously out of the output signals of the vertical scanning shift register 609, the row 7 and the row 8 are simultaneously selected by the output signals of the horizontal scanning shift register 610. By this procedure, the image signals corresponding to the color filters of G of (7,1), (7,3) and the image signals corresponding to the color filters of B of (8,1), (8,3) are read out as the image signal of Cy with addition of four pixel equivalents.

Hereinafter, similarly, the output signals of the vertical scanning shift register 609 and the output signals of the horizontal scanning shift register 610 are controlled so that the image signals corresponding to the color filters of Ye and Cy are alternately read out.

Next, in case of reading out the signals of the primary unit of [1,2], under the condition that the line 6 and the line 8 out of the output signals of the vertical scanning shift register 609 are simultaneously selected, the row 1 and the row 3 are simultaneously selected by the output signals of the horizontal scanning shift register 610. By this procedure, only the image signals corresponding to the color filters of R of (1,6), (1,8) and the image signals corresponding to the color filters of B of (3,6), (3,8) are added by four pixels and read out as the image signals corresponding to the color filters of Mg.

Next, in order to read out the signals of the primary unit of [2,2], with the line 6 and the line 8 selected simultaneously out of the output signals of the vertical scanning shift register 609, the row 6 and the row 8 are simultaneously selected by the output signals of the horizontal scanning shift register 610. By this procedure, the image signals corresponding to the color filters of G of (7,1), (7,3) and the color filters of G of (6,6), (6,8), (8,6), (8,8) are read out with addition of four pixel equivalents.

Hereinafter, in the same manner, the output signal of the vertical scanning shift register 609 and the output signal of the horizontal scanning shift register 610 are controlled so that the image signals corresponding to the color filters of Mg and G are alternately read out.

Also, as to the primary unit of the third order in the vertical direction, in the same manner as in the first order, Ye and Cy are alternately read out with addition of two pixel equivalents, and with respect to the signals having the primary unit of the fourth order in the vertical direction, G and Mg are alternately read out.

Also, by the similar control, in the primary unit of the third order in the vertical direction, the image signals corresponding to the color filters of Ye and Cy, and in the primary unit of the fourth order in the vertical direction, the image signals corresponding to the color filters of G and Mg are alternately read out, respectively.

By repeating the reading out method of the signals of the primary unit from the first to the fourth order in the vertical direction, the output signals of the image pickup device 602 become equivalent to the output signals of the image pickup device having the layout of the color filters of the color difference sequential system of the complementary colors as shown in FIG. 29B.

By thinning the pixels in the manner as described above, the number of pixels substantially decreases to $\frac{1}{16}$, so that the time required for obtaining the signal of one screen portion is shortened to $\frac{1}{16}$. Accordingly, even the camera which takes time in reading out the whole pixels and which is impossible for taking moving picture becomes usable for taking the moving picture.

In the embodiment shown in FIG. 29 A and B, reading out is made by adding the image signals of 4 pixel equivalents out of the primary unit of 16 pixels comprising 4 pixels in the horizontal direction and 4 pixels in the vertical direction, but the number of the pixels to be added is not limited to 4 pixels. However, in case of outputting the images by thinning, the sampling intervals are widened. Therefore, it is desirable, in order to prevent occurrence of return stress, to add a plurality of pixels to lower the response of opening as in the above embodiment.

In the embodiment shown in FIGS. 29 A and B, while using the color filters of RGB primary colors which are advantageous in color reproduction for still images of high resolution, the color filters of color sequence system which are simple in forming the signal processing circuit for obtaining the NTSC output signals can be used as moving picture.

Further, by making the layout of the color filters to be applied to the embodiment shown in FIGS. 29 A and B into an interline layout, the addition control of the signals of the pixels is more simplified than in the case of Bayer layout.

When the primary unit is constituted by the pixels of m×n pixels with m in the horizontal direction and n in the vertical direction, as shown in the embodiments of FIG. 27A to FIG. 29B, when m and n are respectively set to $2^a$ and $2^b$ (a and b are natural numbers), the circuits for selecting the pixels in the vertical scanning shift register 609 and horizontal scanning shift register 610 in FIG. 26 can be constituted by the circuits primaryally in the unit of a binary number, so that the circuit constitution is simplified.

In the embodiments of FIGS. 27A to 29B as detailed above, the signals are read out by non-interlace, but without limited to said system, reading out may be performed by interlace.

In the embodiments of FIGS. 27A and 28 A,B, the sequence of reading out of the image signals corresponding to the respective colors of the color filters in the case of reading out the pixels by thinning is set to be identical with the case of reading out the image signals of the whole pixels. However, the reading out may be made in the changed sequence.

According to the present embodiment, there are obtained the effects as described below.

By setting so that the sequence of the colors of the optical color filters arranged in front of the read out pixels is the same between the case of reading out with thinning and the case of reading out without thinning, the signal processing circuits can be commonly used, and accordingly, the above object of the present invention can be attained by a simple circuit constitution.

Also, in case of reading out with thinning, a signal of complementary color is outputted by adding the output signal of the above pixels corresponding to the nearby optical color filter of different color, and in case of reading out without thinning, the signal of the primary colors is outputted. Accordingly, in case of thinning, an NTSC output signal similar to the case of using the color filter of color difference sequential system is obtainable by a simple signal processing circuit, and in case of no thinning, still images of high resolution are obtainable while using the color filter of RGB primary color which is advantageous in color reproduction.

Also, in case of reading out with thinning, by adding the output signals of each pixel of the image pickup device, generation of return stress can be suppressed.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

What is claimed is:

1. An image pickup apparatus for picking up an object comprising:
   an image pickup device formed by arranging photoelectric conversion elements constituting pixels in two-dimensional directions,
   a reading out circuit for reading out from the image pickup device an electric signal obtained by a photoelectric conversion operation performed by the image pickup device,
   selecting means for selecting from a plurality of reading out modes a reading out mode of the reading out circuit in carrying out reading of the electric signal from the image pickup device, and
   memory means in which reading out positions of the image pickup device are stored respectively in correspondence with the plurality of reading out modes, so that the reading out circuit reads out the electric signals from the image pickup device based on a reading out position corresponding to the reading out mode selected from the plurality of reading out modes by the selecting means, said reading out position being one of the reading out positions of the image pickup device stored in the memory means in correspondence with the plurality of reading out modes.

2. An image pickup apparatus according to claim 1, wherein said plurality of reading out modes comprise a mode of reading out by shifting by plural lines a position of a line of the image pickup device to be selected by scanning in a sub-scanning direction in a period of scanning in a main scanning direction, when the electric signal obtained by the photoelectric conversion operation performed by the image pickup device is read out by the scanning in the main scanning direction and sub-scanning direction.

3. An image pickup apparatus according to claim 1, wherein said plurality of reading out modes comprise a mode of reading out by shifting by plural lines a position of a line of the image pickup device to be selected by scanning in a vertical scanning direction from a position of a line selected immediately before, within a horizontal blanking period during the scanning in the vertical direction, when the electric signal obtained by the photoelectric conversion operation performed by the image pickup device is read out by scanning in a horizontal direction and the vertical direction.

4. An image pickup apparatus according to claim 1, wherein said plurality of reading out modes comprise a mode such that, in reading out the electric signal from the image pickup device by dividing into an odd number field and an even number field during scanning in a vertical direction, reading out is performed during reading out of the odd number field, within a horizontal blanking period after reading out each pixel in odd number order, by shifting a position of a line of the image pickup device to be selected by the scanning in the vertical direction by two lines from a position of a line selected immediately before, and the reading out is performed during reading of the even number field, within the horizontal blanking period after reading out each pixel in even number order, by shifting the position of the line to be selected by the scanning in the vertical direction by two lines from the position of the line selected immediately before.

5. An image pickup apparatus according to claim 3, further comprising means for resetting the pixels in the line direction, when the electric signal from the image pickup device is read out by shifting the position of the line of the image pickup device to be selected by the scanning in the vertical direction by plural lines from the position of the line selected immediately before, within the horizontal blanking period.

6. An image pickup apparatus according to claim 1, wherein said plurality of reading out modes comprise a whole pixel mode for reading out the electric signal from all of the pixels of the image pickup device, a block mode for reading out the electric signal from pixels in a predetermined block, and a skip mode for reading out the electric signal by thinning a part of pixels out of all of the pixels at a predetermined thinning rate, and said reading out circuit has means for changing over the reading out mode between the whole pixel mode and at least one of the block mode and the skip mode, so that at a start up of the image pickup apparatus said image pickup device is driven in one of the block mode and the skip mode.

7. An image pickup apparatus according to claim 1, wherein said plurality of reading out modes comprise a whole pixel mode for reading out the electric signal from all of the pixels of the image pickup device, a block mode for reading out the electric signal from pixels in a predetermined block, and a skip mode for reading out the electric signal by thinning a part of pixels out of all of the pixels at a predetermined thinning rate, and said reading out circuit has means for changing over the reading out mode between the whole pixel mode and at least one of the block mode and the skip mode, and said memory means has an immediately preceding mode memorizing means for memorizing the reading out mode prevailing immediately before an end operation after the end operation of the image pickup apparatus, so that at a start up of the image pickup apparatus the reading out circuit performs reading out of the electric signal in the reading out mode memorized by the immediately preceding mode memorizing means.

8. An image pickup apparatus according to claim 1, wherein said plurality of reading out modes comprise a whole pixel mode for reading out the electric signal from all of the pixels of the image pickup device, a block mode for reading out the electric signal from pixels in a predetermined block, and a skip mode for reading out the electric signal by thinning a part of pixels out of all of the pixels at a predetermined thinning rate, and said reading out circuit has means for changing over the reading out mode between the whole pixel mode and at least one of the block mode and the skip mode, and further means for providing the electric signal read out from the image pickup device with at least one of a freezing processing and a muting processing, at a time of changeover of the reading out mode.

9. An image pickup apparatus according to claim 1, wherein said plurality of reading out modes comprise a whole pixel mode for reading out the electric signal from all of the pixels of the image pickup device, a block mode for reading out the electric signal from pixels in a predetermined block, and a skip mode for reading out the electric signal by thinning a part of pixels out of all of the pixels at a predetermined thinning rate, and said reading out circuit has means for changing over the reading out mode between the whole pixel mode and at least one of the block mode and the skip mode, and further means for providing the electric signal read out from the image pickup device with a muting processing, at a time of the changeover of the reading out mode.

10. An image pickup apparatus according to claim 1, wherein said plurality of reading out modes comprise a whole pixel mode for reading out the electric signal from all of the pixels of the image pickup device, a block mode for reading out the electric signal from pixels in a predetermined block, and a skip mode for reading out the electric signal by thinning a part of pixels out of all of the pixels at a predetermined thinning rate, and said reading out circuit has means for changing over the reading out mode between the whole pixel mode, the block mode and the skip mode, so that, in changing over from the block mode to the whole pixel mode, the block mode is once transferred to the skip mode.

11. An image pickup apparatus according to claim 1, wherein said plurality of reading out modes comprise a block mode for reading out from pixels in a predetermined block, and said reading out circuit has means so that, when one of a position and the size of a region to be read out in the block mode has been changed in the block mode, an electric signal immediately before said change is one of freeze-outputted and mute-outputted.

12. An image pickup apparatus according to claim 1, wherein said plurality of reading out modes comprise a skip mode for reading out by thinning a part of pixels out of all of the pixels at a predetermined thinning rate, and said reading out circuit has means for one of freeze-outputting and mute-outputting the electric signal immediately before a change of the thinning rate in the skip mode.

13. An image pickup apparatus according to claim 1, further comprising a plurality of color filters disposed so that a plurality of colors are in accordance with each pixel of the image pickup device, wherein the reading out means has means for reading out the electric signals from the image pickup device in accordance with respective colors of the plurality of color filters, and the reading out mode comprises a first reading out mode of reading out by thinning predetermined pixels of the image pickup device and a second reading out mode of reading out all of the pixels of the image pickup device without thinning, and wherein sequences of the colors of the color filters are the same between the first reading out mode and the second reading out mode.

14. An image pickup apparatus according to claim 13, wherein, in case that the first reading out mode has been selected by the selecting means, the reading out means has means for reading out by adding the electric signals from pixels corresponding to nearby color filters of same color out of the plurality of color filters.

15. An image pickup apparatus according to claim 13, wherein the plurality of color filters are laid out in a Bayer layout.

16. An image pickup apparatus according to claim 13, wherein the plurality of color filters are laid out in a color difference sequential layout.

17. An image pickup apparatus according to claim 1, further comprising a plurality of primary color filters disposed so that a plurality of primary colors are in accordance with each pixel of the image pickup device, wherein the reading out means has means for reading out the electric signals from the image pickup device in accordance with respective colors of the plurality of color filters, and the plurality of reading out modes comprise a first reading out mode of reading out by thinning predetermined pixels of the image pickup device and a second reading out mode of reading out all of the pixels of the image pickup device without thinning, so that, in case that the first reading out mode has been selected by the selecting means, the reading out means has means for outputting an electric signal of complementary color by adding the electric signals from pixels corresponding to nearby color filters of different colors out of the plurality of primary color filters, and in case that the second reading out mode has been selected by the selecting means, the reading out means has means for outputting an electric signal of a primary color.

18. An image pickup apparatus according to claim 17, wherein the plurality of primary color filters are laid out in an in-line layout.

19. An image pickup apparatus according to claim 17, wherein, in case of taking a still picture, the reading out means carries out a reading out of the electric signals in the second reading out mode, and in case of taking a moving picture, the reading means carries out a reading out of the electric signals in the first reading out mode.

20. An image pickup method for picking up an object comprising:

reading out from an image pickup device an electric signal obtained by a photoelectric conversion operation performed by the image pickup device, said image pickup device being formed by arranging pixel-constituting photoelectric conversion elements in two-dimensional directions, and selecting a reading out mode for reading out the electric signal from the image pickup device in one of a plurality of reading out modes, wherein said reading out is performed and based on a reading out position corresponding to a reading out mode selected from the plurality of reading out modes, said reading out position being one of reading out positions of the image pickup device stored respectively in a memory means in correspondence with the plurality of reading out modes.

\* \* \* \* \*